US 8,174,755 B2

(12) United States Patent
Yamamoto et al.

(10) Patent No.: US 8,174,755 B2
(45) Date of Patent: May 8, 2012

(54) MICROCAPSULES FOR ELECTROPHORETIC DISPLAY DEVICES, AND PROCESSES FOR THEIR PRODUCTION, AND THEIR APPLICATIONS

(75) Inventors: Hitoshi Yamamoto, Chino (JP); Harunobu Komatsu, Matsumoto (JP); Mitsuo Kushino, Inagawa-cho (JP); Tomoyuki Kuwamoto, Nara (JP); Teruki Matsuhita, Suita (JP)

(73) Assignees: Nippon Shokubai Co., Ltd., Osaka (JP); Seiko Epson Corporation, Tokyo (JP)

( * ) Notice: Subject to any disclaimer, the term of this patent is extended or adjusted under 35 U.S.C. 154(b) by 194 days.

(21) Appl. No.: 12/448,090

(22) PCT Filed: Dec. 4, 2007

(86) PCT No.: PCT/JP2007/073743
§ 371 (c)(1),
(2), (4) Date: Jun. 8, 2009

(87) PCT Pub. No.: WO2008/069338
PCT Pub. Date: Jun. 12, 2008

(65) Prior Publication Data
US 2010/0020385 A1 Jan. 28, 2010

(30) Foreign Application Priority Data

Dec. 6, 2006 (JP) ................................. 2006-329902
Oct. 23, 2007 (JP) ................................. 2007-275706

(51) Int. Cl.
*G02B 26/00* (2006.01)
(52) U.S. Cl. ...................................................... 359/296
(58) Field of Classification Search ............ 359/290–296
See application file for complete search history.

(56) References Cited

U.S. PATENT DOCUMENTS 2,800,457 A 7/1957 Green et al.
(Continued)

FOREIGN PATENT DOCUMENTS

GB 1 257 178 12/1971
(Continued)

OTHER PUBLICATIONS

Partial International Search Report dated Jan. 8, 2008 in the International (PCT) Application PCT/JP2007/073743 of which the present application is the U.S. National Stage.
(Continued)

*Primary Examiner* — Scott J Sugarman
*Assistant Examiner* — Vipin Patel
(74) *Attorney, Agent, or Firm* — Wenderoth, Lind & Ponack, L.L.P.

(57) ABSTRACT

The microcapsules for electrophoretic display devices according to the present invention each enclose a dispersion containing electrophoretic particles and a solvent in a shell having an inner shell made of a mercapto group-containing amino resin and an outer shell made of an epoxy resin. Alternatively, the microcapsules for electrophoretic display devices according to the present invention each have a capsule strength of 0.6 MPa or higher. These microcapsules are produced by dispersing a dispersion containing electrophoretic particles and a solvent as a core substance in a water-based medium, and subsequently forming at least one shell on the surface of the core substance. These microcapsules can be used, as their applications, for sheets for electrophoretic display devices, electrophoretic display devices using the sheets, and electronic equipments using the electrophoretic display devices.

17 Claims, 5 Drawing Sheets

U.S. PATENT DOCUMENTS

| | | |
|---|---|---|
| 6,485,736 B1 * | 11/2002 | Shirley et al. ............... 424/424 |
| 6,862,128 B2 | 3/2005 | Katase |
| 7,265,895 B2 * | 9/2007 | Miyazaki et al. ............. 359/296 |
| 7,279,121 B2 * | 10/2007 | Hayashi ....................... 264/4.33 |
| 7,525,719 B2 * | 4/2009 | Yakushiji et al. ............. 359/296 |
| 2003/0025985 A1 | 2/2003 | Katase |
| 2003/0086149 A1 | 5/2003 | Kawai |
| 2006/0222851 A1 | 10/2006 | Miyabayashi et al. |
| 2006/0234053 A1 | 10/2006 | Yamamoto et al. |

FOREIGN PATENT DOCUMENTS

| | | |
|---|---|---|
| JP | 50-15115 | 6/1975 |
| JP | 2551783 | 8/1996 |
| JP | 2003-107535 | 4/2003 |
| JP | 2003-222913 | 8/2003 |
| JP | 2005-338189 | 12/2005 |
| JP | 2006-323364 | 11/2006 |

OTHER PUBLICATIONS

Complete International Search Report dated Feb. 19, 2008 in the International (PCT) Application PCT/JP2007/073743 of which the present application is the U.S. National Stage.

Notice of Reasons for Rejection issued Aug. 3, 2010 in Japanese counterpart Application No. JP2007-275706. (English Translation).

Supplementary European Search Report issued Apr. 27, 2011 in corresponding European Application No. 07 850 317.4.

* cited by examiner

MICROCAPSULES FOR ELECTROPHORETIC DISPLAY DEVICES, AND PROCESSES FOR THEIR PRODUCTION, AND THEIR APPLICATIONS

TECHNICAL FIELD

The present invention relates to microcapsules for electrophoretic display devices, processes for their production, and their applications. More particularly, the present invention relates to microcapsules for electrophoretic display devices, each enclosing a dispersion containing electrophoretic particles and a solvent in a shell, processes for their production, and sheets for electrophoretic display devices, electrophoretic display devices, and electronic equipments, all of which are obtained using the microcapsules.

BACKGROUND ART

An electrophoretic display device displays character data, image data, and the like, by the behavior of electrophoretic particles, for example, when a voltage is applied to a dispersion in which the electrophoretic particles are dispersed in a solvent. For example, if the electrophoretic particles and the solvent are colored with different colors, the color of the electrophoretic particles is observed when the electrophoretic particles are moved to the surface of the solvent by voltage application, and the color of the dispersion is observed when the electrophoretic particles are moved to the bottom of the solvent. If electrodes to which voltage application is made possible by address appointment are provided, different colors for the respective addresses can be displayed, and accordingly, arbitrary character data and image data can be displayed. Moreover, it is possible to rewrite the display data, and at the same time, it is advantageous that the display data can be maintained as it is, even if there is no electric signal.

In recent years, in place of the conventional electrophoretic display devices (e.g., see Japanese Patent Publication No. 50-15115) in which a dispersion of electrophoretic particles are enclosed in spaces between opposed electrode substrates, there have been developed microcapsule type electrophoretic display devices (e.g., see Japanese Patent No. 2551783) with a structure in which microcapsules enclosing a dispersion of electrophoretic particles are arranged between opposed electrode substrates. As compared with the conventional electrophoretic display devices, the microcapsule type electrophoretic display devices are remarkably improved in various performances and functions, such as long-term stability of display, responsiveness, contrast, and display rewritable times.

In general, as a method of preparing microcapsules each enclosing a core substance, since it is advantageous that the strength and thickness of shells can easily be controlled and a shell with two or more layers can be formed, a coacervation method (e.g., see U.S. Pat. No. 2,800,457) is generally said to be preferred. Also in the field of electrophoretic display devices, for example, the research and development of microcapsules each enclosing a dispersion of electrophoretic particles in a shell composed of gelatin and gum arabic as essential components have been carried out using the coacervation method.

However, with respect to an electrophoretic display device using such microcapsules, there is a problem that when the electrophoretic display device is left for a long period of time under high temperature and high humidity conditions (e.g., at 60° C. and 90% RH for 24 hours), the contrast of the electrophoretic display device after that is found to be remarkably decreased.

Thus, the Japanese Patent Laid-open Publication No. 2005-338189 discloses microcapsules for electrophoretic display devices, each enclosing a dispersion of electrophoretic particles in a shell obtained by the reaction of a specific water-soluble surfactant with a compound having an epoxy group or a thiosulfide group, as microcapsules for electrophoretic display devices, which can suppress a decrease in the contrast even after the electrophoretic display devices are left for a long period of time under high temperature and high humidity conditions (e.g., at 60° C. and 90% RH for 24 hours).

DISCLOSURE OF THE INVENTION

According to investigations carried out by the present inventors, it was confirmed that if microcapsules each enclosing a dispersion of electrophoretic particles in a shell composed of gelatin and gum arabic as essential components were left for a long period of time under high temperature and high humidity conditions (e.g., at 60° C. and 90% RH for 24 hours), when an electrophoretic display device was produced, leakage current occurred between electrodes, and therefore, a high voltage was not able to be effectively applied, and consequently, the display performance was decreased. Moreover, when the microcapsules were preserved at room temperature in the form of a coating solution, which was a mixture of the microcapsules and a binder resin, and in the form of a sheet for electrophoretic display devices, which was obtained by applying the coating solution to a PET film with ITO, the coating solution was found to give rotten smell on the third day. One week later, the dispersion considerably leaked from the microcapsules when the sheet for electrophoretic display devices was formed and a display electrode was laminated. The contrast of the electrophoretic display device thus obtained was significantly decreased. With respect to the sheet for electrophoretic display devices, the contrast was found to be decreased after around two weeks, and the contrast was decreased by about 50% or higher in one month.

Moreover, with respect to the microcapsules disclosed in the Japanese Patent Laid-open Publication No. 2005-338189, even when an electrophoretic display device was produced and left for a long period of time under high temperature and high humidity conditions (e.g., at 60° C. and 90% RH for 24 hours), the display performance was not found to be decreased. However, the leakage current value was slightly high. In addition, when a material having low electron mobility, such as a conductive polymer, was used for an electrode, the display performance was significantly decreased. Further, in the same manner as described above, when the microcapsules were preserved at room temperature in the form of a coating solution, which was a mixture of the microcapsules and a binder resin, and in the form of a sheet for electrophoretic display devices, which was obtained by applying the coating solution to a PET film with ITO, the contrast was found to be decreased after about one week for the coating solution and after about two weeks for a paste. Further, the contrast was found to be decreased by 50% or higher after about three weeks for the coating solution and after one month for the paste. In the case of the sheet for electrophoretic display devices, the contrast was found to be slightly decreased after about three weeks.

According to investigations carried out by the present inventors, it was confirmed that the microcapsules each enclosing a dispersion of electrophoretic particles in a shell composed of gelatin and gum arabic as essential components and the microcapsules disclosed in the Japanese Patent Laid-open Publication No. 2005-338189 had generally low capsule strength and for example, when an electronic equipment having an electrophoretic display device as a data displaying means was dropped out of hands during the use of the electronic equipment, the microcapsules were crushed by dropping impact and a portion where data display was impossible was formed in a data displaying part of the electrophoretic display device. Moreover, such microcapsules has a problem that the microcapsules have low resistance to solvents and, for example, when the microcapsules are brought into contact with ethanol, considerable dents are formed in the entire microcapsules and almost all of the contents come out.

Under the above-described circumstances, an object of the present invention is to provide microcapsules for electrophoretic display devices, which have high capsule strength and high solvent resistance, which make it possible to produce an electrophoretic display device showing high contrast and having a low leakage current value, even after the electrophoretic display device is left for a long period of time under high temperature and high humidity conditions (e.g., at 60° C. and 90% RH for 24 hours), and which can be preserved at room temperature over a long period of time in the form of a coating solution or a display sheet; processes for their production; and sheets for electrophoretic display devices, electrophoretic display devices, and electronic equipments, all of which are obtained using the microcapsules.

The present inventors have made various studies, and as a result, they have found that if microcapsules are formed to have a double structure composed of an inner shell made of an amino resin having a high impermeability and an outer shell made of an epoxy resin excellent in chemical resistance and mechanical properties and a mercapto group having a high reactivity with the epoxy resin is introduced into the amino resin forming the inner shell, the inner shell and the outer shell are firmly bonded to improve capsule strength, and therefore, the above-described problems can be solved.

The present inventors have further found that if the outer shell is made of a melamine-crosslinked epoxy resin, microcapsules with higher performance can be obtained. The present inventors have further found that if a dispersion containing electrophoretic particles and a solvent is used as a core substance and the core substance is dispersed in a water-based medium, particularly using a specific polysaccharide having a polymer structure formed by bonding water-soluble monosaccharides such as galactose and arabinose, and then, the shell is formed on the surface of the core substance, reducing saccharide parts (specifically, monosaccharide parts having an aldehyde group and/or a ketone group) of the polysaccharide become initial points of the reaction of forming the shell, and since such a polysaccharide have many initial points, the shell formed on the surface of the core substance are to be provided with a dense structure, and accordingly, microcapsules with improved capsule strength and solvent resistance can be obtained. Thus, the present invention has been completed.

That is, the present invention provides a microcapsule for electrophoretic display devices, enclosing a dispersion containing electrophoretic particles and a solvent in a shell, wherein the shell comprises an inner shell made of a mercapto group-containing amino resin and an outer shell made of an epoxy resin. In such a microcapsule for electrophoretic display devices, the outer shell may preferably be made of a melamine-crosslinked epoxy resin.

The present invention further provides a process for producing microcapsules for electrophoretic display devices, comprising: dispersing a dispersion containing electrophoretic particles and a solvent as a core substance in a water-based medium; subsequently carrying out a condensation reaction using an initial condensation product obtained by the reaction of at least one compound selected from the group consisting of urea, thiourea, melamine, benzoguanamine, acetoguanamine, and cyclohexylguanamine with formaldehyde, in a presence of a compound having a mercapto group(s) and either a carboxyl groups(s) or a sulfo group(s), thereby forming an inner shell made of a mercapto group-containing amino resin on a surface of the core substance; dispersing microcapsules each enclosing the core substance in the inner shell in a water-based medium; and subsequently adding an epoxy group-containing compound thereto, thereby forming an outer shell made of an epoxy resin on an outer surface of the inner shell. In such a production process, a crosslinking agent may preferably be reacted with the epoxy group-containing compound when the outer shell is formed and/or an epoxy-melamine condensation product may preferably be added in addition to the epoxy group-containing compound when the outer shell is formed.

The present invention further provides a microcapsule for electrophoretic display devices, enclosing a dispersion containing electrophoretic particles and a solvent in a shell, wherein the microcapsule has a capsule strength of 0.6 MPa or higher. In such a microcapsule for electrophoretic display devices, the shell may preferably comprise an inner shell made of a mercapto group-containing amino resin and an outer shell made of an epoxy resin and the outer shell may more preferably be made of a melamine-crosslinked epoxy resin.

The present invention further provides a process for producing microcapsules for electrophoretic display devices, comprising: dispersing a dispersion containing electrophoretic particles and a solvent as a core substance in a water-based medium using a polysaccharide containing 10% by mass or greater of galactose unit and arabinose unit; and subsequently forming at least one shell on a surface of the core substance.

The present invention further provides a sheet for electrophoretic display devices, comprising a layer containing the above-described microcapsules for electrophoretic display devices and a binder resin. In such a sheet for electrophoretic display devices, the layer containing the microcapsules and the binder resin may preferably be formed on a conductive film.

The present invention further provides an electrophoretic display device comprising a data displaying part, wherein the data displaying part may comprise the above-described sheet for electrophoretic display devices.

The present invention further provides an electronic equipment comprising a data displaying means, wherein the data displaying means may comprise the above-described electrophoretic display device.

The microcapsules for electrophoretic display devices of the present invention have high capsule strength and solvent resistance, and at the same time, make it possible to produce an electrophoretic display device showing high contrast and having a low leakage current value, even after the electrophoretic display device is left for a long period of time under high temperature and high humidity conditions (e.g., at 60° C. and 90% RH for 24 hours), and can be preserved at room temperature over a long period of time in specific forms. In the process for producing microcapsules for electrophoretic display devices according to the present invention, since a mercapto group is introduced into an amino resin forming an inner shell, the reaction with an epoxy resin forming an outer shell is rapidly promoted at a relatively low temperature, so that microcapsules for electrophoretic display devices can efficiently be produced.

In another process for producing microcapsules for electrophoretic display devices according to the present invention, when a dispersion containing electrophoretic particles and a solvent is dispersed as a core substance in a water-based medium, since a specific polysaccharide may be used as a dispersant, microcapsules for electrophoretic display devices can easily be produced. With respect to the sheet for electrophoretic display devices according to the present invention, since microcapsules for electrophoretic display devices dispersed in a binder resin have high capsule strength, the microcapsules can be preserved stably for a long period of time under room temperature conditions (e.g., at 25° C. and 60% RH) without leaking the dispersion.

Since the above-described microcapsules are used, the electrophoretic display device and the electronic equipment of the present invention are excellent in display performance such as contrast, and can show a low leakage current value and maintain excellent display performance, even after they are left for a long period of time under high temperature and high humidity conditions (e.g., at 60° C. and 90% RH for 24 hours).

BEST MODE FOR CARRYING OUT THE INVENTION

<<Microcapsules for Electrophoretic Display Devices>>

Figure 1:
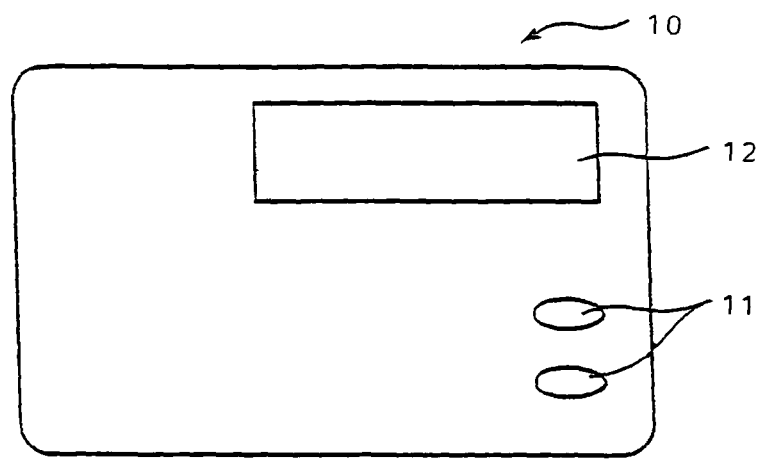
FIG. 1 is a plan view showing one example of an IC card which is one embodiment of the electronic equipment of the present invention.

The microcapsules for electrophoretic display devices according to the present invention are, in one embodiment, microcapsules for electrophoretic display devices, each enclosing a dispersion containing electrophoretic particles and a solvent in a shell, wherein the shell comprises an inner shell made of a mercapto group-containing amino resin and an outer shell made of an epoxy resin. In such microcapsules for electrophoretic display devices, the outer shell may preferably be made of a melamine-crosslinked epoxy resin.

The microcapsules for electrophoretic display devices according to the present invention are, in another embodiment, microcapsules for electrophoretic display devices, each enclosing a dispersion containing electrophoretic particles and a solvent in a shell, wherein the microcapsules each have a capsule strength of 0.6 MPa or higher. In such microcapsules for electrophoretic display devices, the shell may preferably comprise an inner shell made of a mercapto group-containing amino resin and an outer shell made of an epoxy resin, and the outer shell may more preferably be made of a melamine-crosslinked epoxy resin.

In the following, these microcapsules for electrophoretic display devices are not distinguished from each other and may hereinafter be referred to as the "microcapsules of the present invention" or simply the "microcapsules".

The following will describe in detail the microcapsules of the present invention; however, the microcapsules of the present invention are not restricted to the following explanation, and besides the following exemplified matter, they can be put into practice after appropriate modifications or variations within such a range that the gists of the present invention are not adversely affected.

<Physical Properties of Microcapsules>

The microcapsules of the present invention each have a capsule strength of usually 0.6 MPa or higher, preferably 1 MPa or higher, more preferably 3 MPa or higher, and still more preferably 5 MPa or higher. The upper limit of the capsule strength of the microcapsules is not particularly limited. However, if the capsule strength is very high, the flexibility of the microcapsules is decreased. In the case where a sheet for electrophoretic display devices is produced, since air gaps are formed between the microcapsules and the adjacent microcapsules, the display performance may possibly be decreased when the microcapsules are used for electrophoretic display devices. Therefore, the upper limit of the capsule strength of the microcapsules is, for example, about 50 MPa. The capsule strength of the microcapsules means the compressive strength of the microcapsules as measured by a micro compression tester (e.g., trade name: MCT-W500, available from Shimadzu Corporation).

When the microcapsules of the present invention are used for electrophoretic display devices, the microcapsules in a part where a steel ball is dropped are not crushed, even if the steel ball is dropped from a height of 10 cm or higher, preferably 20 cm or higher, and more preferably 30 cm or higher, in a steel ball dropping test as described below in Examples. In general, in the steel ball dropping test, in the case where the microcapsule have low capsule strength so that the microcapsules in a part where a steel ball is dropped are crushed when the steel ball is dropped from a height lower than the above-described height, if an electronic equipment having, as a data displaying means, an electrophoretic display device using such microcapsules is dropped out of hands during the use of the electronic equipment, the microcapsules are crushed by dropping impact and a portion where data display becomes impossible is formed in the data displaying part of the electrophoretic display device. Therefore, such microcapsules are not preferred.

The microcapsules of the present invention have flexibility to a certain extent, and since their shape can be changed by outside pressure, the shape is not particularly limited, but it may preferably be particulate, e.g., truly spherical, when there is no outside pressure.

The particle diameter of the microcapsules of the present invention is not particularly limited, but it may preferably be from 5 to 300 μm, more preferably from 10 to 200 μm, and still more preferably from 15 to 150 μm. If the particle diameter of the microcapsules is smaller than 5 μm, it may become impossible to obtain sufficient display density in a display part when an electrophoretic display device is produced. To the contrary, if the particle diameter of the microcapsules is greater than 300 μm, the strength of the microcapsules may be decreased, and the electrophoretic properties of electrophoretic particles in a dispersion enclosed in the microcapsules cannot sufficiently be exhibited, and accordingly, the driving voltage for display may be increased, when an electrophoretic display device is produced. The particle diameter of the microcapsules means their volume average particle diameter as measured by a laser scattering particle size distribution analyzer (e.g., trade name: LA-910, available from Horiba, Ltd.).

The variation coefficient (i.e., the narrowness of particle size distribution) of the particle diameter of the microcapsules of the present invention is not particularly limited, but it may preferably be 30% or lower, more preferably 25% or lower, and still more preferably 20% or lower. If the variation coefficient of the particle diameter is higher than 30%, microcapsules having an effective particle diameter may be decreased, and therefore, a great number of microcapsules may have to be used in some cases.

The particle diameter and its variation coefficient of the microcapsules of the present invention are considerably dependent on the particle diameter and particle size distribution of a dispersion obtained by dispersing the microcapsules in a water-based medium when the microcapsules are produced. Therefore, it is made possible to obtain microcapsules having a desired particle diameter and its variation coefficient by appropriately adjusting the dispersing conditions of the dispersion.

<Shells of Microcapsules>

The microcapsules of the present invention each enclose, in one embodiment, a dispersion containing electrophoretic particles and a solvent in a shell having an inner shell formed of a mercapto group-containing amino resin and an outer shell formed of an epoxy resin. In general, an amino resin forming the inner shell has a high impermeability and an epoxy resin forming the outer shell is excellent in chemical resistance and mechanical properties. Moreover, since the amino resin forming the inner shell and the epoxy resin forming the outer shell are bonded firmly through mercapto groups, the capsule strength is improved. Therefore, the microcapsules scarcely cause leakage of the dispersion and are hardly broken by laminate pressure applied when an electrophoretic display device is produced. Accordingly, when an electrophoretic display device is produced, the microcapsules show high contrast and a low leakage current value even if the electrophoretic display device is left under high temperature and high humidity conditions for a long period of time (e.g., at 60° C. and 90% RH for 24 hours). In addition, the microcapsules can be preserved, even in the form of a mixture with a binder resin, i.e., even in the form of a coating solution or a sheet for electrophoretic display devices, at room temperature over a long period of time.

In the microcapsules as described above, the inner shell is made of an amino resin having mercapto groups. The inner shell can be formed by using a dispersion containing electrophoretic particles and a solvent as a core substance, dispersing the core substance in a water-based medium, and subsequently carrying out a condensation reaction using an initial condensation product obtained by the reaction of at least one compound selected from the group consisting of urea, thiourea, melamine, benzoguanamine, acetoguanamine, and cyclohexylguanamine with formaldehyde in the presence of a compound having a mercapto group(s) and either a carboxyl group(s) or a sulfo group(s). In this connection, it can be analyzed by a Fourier transform infrared spectroscopy (FTIR) that the amino resin forming the inner shell has mercapto groups.

In the microcapsules as described above, the outer shell is made of an epoxy resin. The outer shell can be formed by adding a compound having an epoxy group(s) after the microcapsules each enclosing the core substance in the inner shell are dispersed in a water-based medium. When the outer shell is formed, it is preferred to cause a reaction of the compound having an epoxy group(s) with a crosslinking agent and/or add an epoxy-melamine condensate product in addition to the compound having an epoxy group(s) since the strength and impermeability of the outer shell are improved, so that the microcapsules are provided with higher performance.

In the process for producing the microcapsules according to the present invention in another embodiment, a dispersion containing electrophoretic particles and a solvent is used as a core substance, and the core substance is dispersed in a water-based medium using, as a dispersant, a polysaccharide containing 10% by mass or greater of galactose unit and arabinose unit, and subsequently, at least one shell is formed on the surface of the core substance. In this case, the shell of each of the microcapsules is not particularly limited, so long as the most inner wall layer is made of a resin-like reaction product formed by reaction using, as initial points, the reducing saccharide parts (specifically, monosaccharide parts having an aldehyde group and/or a ketone group) of the polysaccharide used for producing the microcapsules, and specifically, the shell may have a wall layer made of a mercapto group-containing amino resin and/or a wall layer made of an epoxy resin. Examples of the shell may include monolayer shells each having a wall layer made of a mercapto group-containing amino resin; monolayer shells each having a wall layer made of an epoxy resin; double-layer shells each having an inner shell made of a mercapto group-containing amino resin and an outer shell made of an epoxy resin; double-layer shells each having an inner shell made of an epoxy resin and an outer shell made of a mercapto group-containing amino resin; and multi-layer shells each having a first wall layer made of a mercapto group-containing amino resin, a second wall layer made of an epoxy resin, and at least one layer, as third and more wall layers, on the outside of the second wall layer. All of these shells have sufficient capsule strength, and in these shells, double-layer shells each having an inner shell made of a mercapto group-containing amino resin and an outer shell made of an epoxy resin may particularly be preferred.

As described above, when a specific polysaccharide having a polymer structure formed by bonding water-soluble monosaccharides such as galactose and arabinose is used, reducing saccharide parts (specifically, monosaccharide parts having an aldehyde group and/or a ketone group) of the polysaccharide become initial points of the reaction of forming the shell. Since such a polysaccharide has many initial points, the shell is to be provided with a dense structure, and accordingly, capsule strength and solvent resistance can be improved.

In the multi-layer shell, the third and more wall layers may be formed using similar materials to those of the capsule shell in any of the heretofore known microcapsules by any of the heretofore known methods, for example, a coacervation method, an in-situ polymerization method, and an interface polymerization method. In the case of producing the third and more wall layers by the coacervation method, the materials for forming the third and more wall layers may preferably be, for example, combinations of compounds having an isoelectric point, such as gelatin, or cationic compounds such as polyethylene imine with anionic compounds such as gum arabic, sodium alginate, styrene-maleic anhydride copolymers, vinyl methyl ether-maleic anhydride copolymers, starch phthalic acid esters, and poly(acrylic acid). In the case of producing the third and more wall layers by the in-situ polymerization method, the materials may preferably be, for example, melamine-formalin resins (melamine-formalin prepolymers), radical polymerizable monomers, and the like.

Further, in the case of producing the third and more wall layers by the interface polymerization method, the materials may preferably be, for example, combinations of hydrophilic monomers such as polyamines, glycols, and polyphenols with hydrophobic monomers such as polybasic acid halides and polyisocyanates, and wall layers made of polyamides, epoxy resins, polyurethanes, polyurea, or the like are formed.

The thickness of the shells of the microcapsules of the present invention (in the case where the shell has multi-layers, the total thickness of all of the wall layers and for example, in the case where the shell has two layers, the total thickness of the inner shell and the outer shell) is not particularly limited, but it may preferably be, for example, from 0.1 to 5 µm, more preferably from 0.1 to 4 µm, and still more preferably from 0.1 to 3 µm, in a swollen state. If the thickness of the shells of the microcapsules is thinner than 0.1 µm, it may become impossible to obtain sufficient capsule strength. To the contrary, if the thickness of the shells of the microcapsules is thicker than 5 µm, transparency is decreased, so that when the microcapsules are used for electrophoretic display devices, it may result in a contrast decrease; and the flexibility of the microcapsules is decreased, and therefore, when a sheet for electrophoretic display devices is produced, the adhesiveness to an electrode film may become insufficient.

<Core Substance of Microcapsules>

The microcapsules of the present invention each enclose a dispersion containing electrophoretic particles and a solvent as a core substance in a shell.

In general, there are, as a method for electrophoretic display, a display method on the basis of a contrast between the color of a solvent and the color of electrophoretic particles in a dispersion, and a display method on the basis of a contrast between the colors of at least two types of electrophoretic particles in a dispersion.

The electrophoretic particles to be used for the dispersion may be solid particles having electrophoretic properties, that is, colored particles showing positive or negative polarity in the dispersion and are not particularly limited, but, for example, pigment particles may be employed. Alternatively, polymer particles colored with dyes or polymer particles containing pigments may also be used. These solid particles may be used alone, or two or more of these solid particles may also be used in combination. In these solid particles, pigment particles may be preferred. In this connection, when solid particles having no electrophoretic properties in the dispersion are used as the electrophoretic particles, the electrophoretic properties are provided by any of the heretofore known methods. Alternatively, solid particles having electrophoretic properties in the dispersion and solid particles having no electrophoretic properties in the dispersion may also be used in combination.

The pigment particles to be used as the electrophoretic particles are not particularly limited, but they may be particles of, as white types, inorganic pigments such as titanium oxide, barium sulfate, zinc oxide, and zinc flower; as yellow types, inorganic pigments such as yellow iron oxide, cadmium yellow, titanium yellow, and chrome yellow, and organic pigments, e.g., insoluble azo compounds such as fast yellow, fused azo compounds such as chromophthal yellow, azo complex salts such as benzimidazolone azo yellow, fused polycyclic compounds such as flavans yellow, hansa yellow, naphthol yellow, nitro compounds, and pigment yellow; as orange types, inorganic pigments such as molybdate orange, and organic pigments, e.g., azo complex salts such as benzimidazolone azo orange and fused polycyclic compounds such as perynone orange; as red types, inorganic pigments such as colcothar and cadmium red, and organic pigments, e.g., dye lakes such as madder lake, soluble azo compounds such as lake red, insoluble azo compounds such as naphthol red, fused azo compounds such as chromophthal scarlet, fused polycyclic compounds such as thioindigo Bordeaux, quinacridone pigments such as Cinquasia red Y and hostarparm red, and azo type pigments such as permanent red and fast slow red; as violet types, inorganic pigments such as manganese violet, and organic pigments, e.g., dye lakes such as Rhodamine lake, and fused polycyclic compounds such as dioxazine violet; as blue types, inorganic pigments such as Prussian blue, ultramarine, cobalt blue, and cerulean blue, and organic pigments, e.g., phthalocyanines such as phthalocyanine blue, indanthrenes such as indanthrene blue, and alkali blue; as green types, inorganic pigments such as emerald green, chrome green, chromium oxide, and viridian, and organic pigments, e.g., azo complex salts such as nickel azo yellow, nitroso compounds such as pigment green, and naphthol green, and phthalocyanines such as phthalocyanine green; as black types, inorganic pigments such as carbon black, titanium black, and iron black, and organic pigments such as aniline black. These pigment particles may be used alone, or two or more of these pigment particles may also be used in combination. In these pigment particles, there may be preferred white type pigment particles such as titanium oxide and black type pigment particles such as carbon black and titanium black.

When fine particles of titanium oxide are used, their type is not particularly limited, and so far as they are widely used as white type pigments, the particles may be either the rutile type or the anatase type, but taking into consideration the color fading of a coloring agent due to the photocatalyst activity of titanium oxide, the rutile type which has lower photocatalyst activity may be preferred, and further, in order to lower the photocatalyst activity, it may be more preferred to use titanium oxide which has been subjected to Si treatment, Al treatment, Si—Al treatment, or Zn—Al treatment.

When polymer particles are used as the electrophoretic particles, their component polymer is not particularly limited, but examples of the polymer may include polyolefin type polymers, poly(halogenated polyolefin) type polymers, polyester type polymers, polyurethane type polymers, polystyrene type polymers, acrylic type polymers, epoxy type polymers, melamine type polymers, and urea type polymers. The term "polymer(s)" as used herein may include homopolymers and copolymers obtained by copolymerization of a monomer(s) with a small amount of a copolymerizable monomer(s). These polymer particles may be used alone, or two or more of these polymer particles may also be used in combination. Dyes for coloring these polymer particles are not particularly limited, but examples of the dyes may include dyes recited below as the dye for coloring a solvent. The pigment to be added to these polymer particles is not particularly limited, but examples of the pigment may include pigments recited above as the pigment to be used for the electrophoretic particles.

The concentration of electrophoretic particles in a dispersion (i.e., percent by mass of the electrophoretic particles, relative to the mass of the dispersion) may preferably be from 5% to 60% by mass, more preferably from 7% to 55% by mass, and still more preferably from 10% to 50% by mass. If the concentration of electrophoretic particles is lower than 5% by mass, no sufficient chromaticity can be obtained, and contrast may be decreased to result in the unclearness of display. To the contrary, if the concentration of electrophoretic particles is higher than 60% by mass, the viscosity of a dispersion may be increased, so that dispersion treatment may become difficult, and the electrophoretic particles may be aggregated in a part to which voltage is applied for display, and it may lead to a decrease of contrast and a decrease of response speed (display responsiveness) of the electrophoretic particles.

The particle diameter of electrophoretic particles is not particularly limited, but it may preferably be from 0.1 to 5 µm, more preferably from 0.1 to 4 µm, and still more preferably from 0.1 to 3 µm. If the particle diameter of electrophoretic particle is smaller than 0.1 µm, no sufficient chromaticity can be obtained, and when the electrophoretic particles are used for an electrophoretic display device, contrast may be decreased to result in the unclearness of display. To the contrary, if the particle diameter of electrophoretic particles is greater than 5 µm, it is needed to heighten the coloration degree of the electrophoretic particles themselves beyond necessity, and accordingly, the use amount of pigments may be increased, and when the electrophoretic particles are used for an electrophoretic display device, it may become difficult for the electrophoretic particles to rapidly move in a part to which voltage is applied for display, so that their response speed (display responsiveness) may be decreased. The particle diameter of electrophoretic particles means their volume average particle diameter measured by a dynamic light scattering nanoparticle size analyzer (e.g., trade name: LB-500, available from Horiba, Ltd.).

The electrophoretic particles may be dispersed as they are in a solvent, but after the surfaces of electrophoretic particles are treated by the reaction with a coupling agent, or by polymer grafting treatment, or by coating with a polymer, the electrophoretic particles may be dispersed in a solvent. When the surface treatment is carried out, the electrophoretic particles may preferably be pigment particles surface-treated with a coupling agent or a polymer. In the present invention, surface-treated electrophoretic particles may be referred simply to as electrophoretic particles.

The solvent to be used for the dispersion is not particularly limited, but may be any of the solvent which have heretofore been widely used for a dispersion for electrophoretic display devices, and more specifically, there may be used those which are substantially insoluble in water (hydrophobic) and cause no interaction with the shells of the microcapsules to an extent that the functions of the microcapsules are not inhibited, and for example, highly insulating organic solvents may be preferred.

Examples of the highly insulating organic solvents may include aromatic hydrocarbons, e.g. benzene type hydrocarbons such as benzene, toluene, o-xylene, m-xylene, p-xylene, mixed xylene, ethylbenzene, hexylbenzene, dodecylbenzene, and phenylxylylethane; aliphatic hydrocarbons, e.g. paraffin type hydrocarbons such as n-hexane and n-decane, isoparaffin type hydrocarbons such as Isopar (registered trade mark) series (available from Exxon Kagaku K.K.), olefin type hydrocarbons such as 1-octene and 1-decene, and naphthene type hydrocarbons such as cyclohexane and decalin; petroleum- and coal-derived hydrocarbon mixtures such as kerosene, petroleum ethers, petroleum benzin, ligroin, industrial gasoline, coal tar naphtha, petroleum naphtha, and solvent naphtha; halogenated hydrocarbons such as dichloromethane, chloroform, carbon tetrachloride, 1,2-dichloroethane, 1,1,1-trichloroethane, 1,1,2,2-tetrachloroethane, trichlorofluoroethane, tetrabromoethane, dibromotetrafluoroethane, tetrafluorodiiodoethane, 1,2-dichloro ethylene, trichloroethylene, tetrachloroethylene, trichlorofluoroethylene, chlorobutane, chlorocyclohexane, chlorobenzene, o-dichlorobenzene, bromobenzene, iodomethane, diiodomethane, and iodoform; silicone oils such as dimethylsilicone oil and methylphenylsilicone oil; and fluorine type solvents such as hydrofluoro ethers. These organic solvents may be used alone, or two or more of these organic solvents may also be used in combination. In these organic solvents, long-chain alkylbenzenes such as hexylbenzene and dodecylbenzene, phenylxylylethane, Isoper (registered trade mark) series (available from Exxon Kagaku K.K.), and dimethylsilicone oil may be preferred since they have high boiling points and high ignition points and have almost no toxicity.

When a solvent is colored, it may be preferred to carry out colorization to an extent that sufficient contrast can be obtained to the color of electrophoretic particles (e.g., to white in the case of fine particles of titanium oxide).

When a solvent is colored, a dye to be used for the colorization is not particularly limited, but oil-soluble dyes may be preferred, and particularly in terms of usability, azo dyes and anthraquinone dyes may be preferred. Specific examples of the dye may include, as yellow type dyes, azo compounds such as OIL YELLOW 3G (available from Orient Chemical Industries, Ltd.); as orange type dyes, azo compounds such as FAST ORANGE G (available from BASF AG); as blue type dyes, anthraquinones such as MACROLEX BLUE RR (available from BAYER AG); as green type dyes, anthraquinones such as SUMIPLAST GREEN G (available from Sumitomo Chemical Co., Ltd.); as brown type dyes, azo compounds such as OIL BROWN GR (available from Orient Chemical Industries, Ltd.); as red type dyes, azo compounds such as OIL RED 5303 (available from Arimoto Chemical Co., Ltd.) and OIL RED 5B (available from Orient Chemical Industries, Ltd.); as violet type dyes, anthraquinones such as OIL VIOLET #730 (available from Orient Chemical Industries, Ltd.); and as black type dyes, azo compounds such as SUDAN BLACK X60 (available from BASF AG) and mixtures of anthraquinone type MACROLEX BLUE FR (available from BAYER AG) and azo type OIL RED XO (available from Kanto Chemical Co., Inc.). These dyes may be used alone, or two or more of these dyes may also be used in combination.

The dispersion may contain, if necessary, a dye(s), a dispersant(s), an electric charge controlling agent(s), a viscosity modifier(s), and the like, besides electrophoretic particles and a solvent. Their addition amounts are not particularly limited, but may appropriately be adjusted to an extent that they neither affect the electrophoretic particles nor inhibit the functions of the electrophoretic particles.

<Applications of Microcapsules>

The microcapsules of the present invention are microcapsules for electrophoretic display devices, and therefore, they can be used for electronic equipments each having a display device for which an electrophoretic display device can be used or applied. The electronic equipments each having such a display device are not particularly limited, and examples thereof may include personal computers, work stations, word processors, IC cards, IC tags, electronic notepads, electronic dictionaries, IC recorders, electronic books, electronic papers, electronic notebooks, electronic calculators, electronic newspapers, electronic white boards, direction boards, advertisement boards, various types of displays, TV sets, DVD players, digital still cameras, view finder-type or monitor direct view-type video cameras, car navigation systems, mobile phones, videophones, pagers, mobile terminals, POS terminals, and various kinds of equipments having touch panels. These electronic equipments have heretofore been known, and the electronic equipment of the present invention can be obtained by replacing their display devices with electrophoretic display devices using the microcapsules of the present invention.

<<Processes for Producing Microcapsules for Electrophoretic Display Devices>>

The process for producing the microcapsules for electrophoretic display devices according to the present invention comprises, in one embodiment, dispersing a dispersion containing electrophoretic particles and a solvent as a core substance in a water-based medium; subsequently carrying out a condensation reaction using an initial condensation product obtained by the reaction of at least one compound selected from the group consisting of urea, thiourea, melamine, benzoguanamine, acetoguanamine, and cyclohexylguanamine with formaldehyde, in the presence of a compound having a mercapto group(s) and either a carboxyl group(s) or a sulfo group(s), thereby forming an inner shell made of a mercapto group-containing amino resin on the surface of the core substance; dispersing microcapsules each enclosing the core substance in the inner shell in a water-based medium; and successively adding an epoxy group-containing compound thereto, thereby forming an outer shell made of an epoxy resin on the outer surface of the inner shell. In such a production process, a crosslinking agent may preferably be reacted with the epoxy group-containing compound when the outer shell is formed and/or an epoxy/melamine condensation compound may preferably be added in addition to the epoxy group-containing compound when the outer shell is formed.

The process for producing the microcapsules for electrophoretic display devices according to the present invention comprises, in another embodiment, dispersing a dispersion containing electrophoretic particles and a solvent as a core substance in a water-based medium using a polysaccharide containing 10% by mass or greater of galactose unit and arabinose unit; and subsequently forming at least one shell on the surface of the core substance.

In the following, these production processes are not distinguished from each other and may hereinafter be referred to as the "production process of the present invention".

The following will describe in detail the production process of the present invention along the respective steps for the case where the shells of the microcapsules are particularly preferred double-layer shells each having an inner shell made of a mercapto group-containing amino resin and an outer shell made of an epoxy resin. However, the production process of the present invention is not restricted to the following explanation, and besides the following exemplified matter, it can be put into practice after appropriate modifications or variations within such a range that the gists of the present invention are not adversely affected.

<Dispersing of Core Substance>

First, using a dispersion containing electrophoretic particles and a solvent as a core substance, the core substance is dispersed in a water-based medium. The water-based medium is not particularly limited, but there can be used, for example, water or a mixed solvent of water with a hydrophilic organic solvent. When water and a hydrophilic organic solvent are used in combination, the addition amount of water may preferably be from 70% to 95% by mass, more preferably from 75% to 95% by mass, and still more preferably from 80% to 95% by mass.

The hydrophilic organic solvent is not particularly limited, but examples of the hydrophilic organic solvent may include alcohols such as methanol, ethanol, n-propyl alcohol, isopropyl alcohol, and allyl alcohol; glycols such as ethylene glycol, propylene glycol, butylene glycol, pentanediol, hexanediol, heptanediol, and dipropylene glycol; ketones such as acetone, methyl ethyl ketone, methyl propyl ketone, and methyl isobutyl ketone; esters such as methyl formate, ethyl formate, methyl acetate, and methyl acetoacetate; and ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. These hydrophilic organic solvents may be used alone, or two or more of these hydrophilic organic solvents may also be used in combination.

The water-based medium may be used in combination with another solvent besides water and a hydrophilic organic solvent. Examples of another solvent may include hexane, cyclopentane, pentane, isopentane, octane, benzene, toluene, xylene, ethylbenzene, aminylsqualene, petroleum ethers, terpene, castor oil, soybean oil, paraffin, and kerosene. When another solvent is used in combination, its use amount may preferably be 30% by mass or lower, more preferably 25% by mass or lower, and still more preferably 20% by mass or lower, relative to the water-based medium containing water and a hydrophilic organic solvent.

The amount of the core substance to be dispersed in a water-based medium is not particularly limited, but it may preferably be from 5 to 70 parts by mass, more preferably from 8 to 65 parts by mass, and still more preferably from 10 to 60 parts by mass, relative to 100 parts by mass of the water-based medium. If the amount for dispersion is lower than 5 parts by mass, the concentration of the core substance is low, so that it may take a long time to form capsule shells, and it may become impossible to produce desired microcapsules, and the microcapsules may have a wide particle size distribution to decrease production efficiency. To the contrary, if the amount for dispersion is higher than 70 parts by mass, the core substance is aggregated and the water-based medium is suspended in the core substance to make it impossible to produce microcapsules.

When the core substance is dispersed in a water-based medium, a dispersant may be used, if necessary. The dispersant is not particularly limited, but examples of the dispersant may include water-soluble polymers (e.g., polyvinyl alcohol (PVA), carboxymethyl cellulose (CMC), gelatin, and polysaccharides such as gum arabic, soybean polysaccharides, and Ghatti gum) and surfactants (e.g., anionic surfactants, cationic surfactants, amphoteric surfactants, and nonionic surfactants). These dispersants may be used alone, or two or more of these dispersants may also be used in combination. The addition amount of these dispersants is not particularly limited, so long as it does not inhibit inner shell formation, and it may appropriately be adjusted.

In the production process of the present invention in another embodiment, a dispersion containing electrophoretic particles and a solvent as a core substance is dispersed in a water-based medium using, as a dispersant, a polysaccharide containing 10% by mass or greater of galactose unit and arabinose unit.

The polysaccharide to be used as a dispersant may have a content of galactose unit and arabinose unit, which is usually not smaller than 10% by mass and not greater than 95% by mass, preferably not smaller than 20% by mass and not greater than 90% by mass, and more preferably not smaller than 30% by mass and not greater than 85% by mass. The content of galactose unit and arabinose unit in the polysaccharide can be determined by hydrolyzing the polysaccharide and then analyzing the hydrolyzed product with high performance liquid chromatography (HPLC) or liquid chromatography/mass spectrometry (LC/MS).

Examples of the polysaccharide as described above may include soybean polysaccharides such as trade name: SOYAFIBE-S series (available from Fuji Oil Co., Ltd.) and trade name: SM series (available from San-Ei Gen F. F. I., Inc.); and Ghatti gum such as trade name: Ghatti Gum SD (available from San-Ei Gen F. F. I., Inc.). These polysaccharides may be used alone, or two or more of these polysaccharides may also be used in combination. In these polysaccharides, soybean polysaccharides and/or Ghatti gum may particularly be preferred.

The number average molecular weight of the polysaccharide to be use in the present invention is not particularly limited, but it may preferably be not lower than 1,000 and not higher than 1,000,000, more preferably not lower than 10,000 and not higher than 900,000, and still more preferably not lower than 50,000 and not higher than 500,000. If the number average molecular weight of the polysaccharide is lower than 1,000, the solvent resistance of the microcapsules may possibly be lowered. To the contrary, if the number average molecular weight of the polysaccharide is higher than 1,000,000, the viscosity of an aqueous polysaccharide solution may become so high to inhibit the formation of an inner shell. The number average molecular weight of the polysaccharide can be measured, for example, by gel permeation chromatography (GPC; e.g., by standard polystyrene calibration).

The concentration of an aqueous polysaccharide solution when the core substance is dispersed in a water-based medium is not particularly limited, but it may preferably be not lower than 0.1% by mass and not higher than 90% by mass, more preferably not lower than 1% by mass and not higher than 70% by mass, still more preferably not lower than 3% by mass and not higher than 50% by mass, and most preferably not lower than 5% by mass and not higher than 35% by mass. If the concentration of an aqueous polysaccharide solution is lower than 0.1% by mass, it may become impossible to obtain an effect of stably dispersing the core substance. To the contrary, if the concentration of an aqueous polysaccharide solution is higher than 90% by mass, the viscosity of the aqueous polysaccharide solution may become so high to inhibit the formation of an inner shell.

When a specific polysaccharide as described above is used as a dispersant, any of the other dispersants may be used in combination, if necessary. The other dispersants are not particularly limited, and examples thereof may include dispersants exemplified above as the dispersant to be used, if necessary, for dispersing the core substance in a water-based medium. These dispersants may be used alone, or two or more of these dispersants may also be used in combination. The addition amount of these dispersants is not particularly limited, so long as it does not inhibit the formation of an inner shell, and may appropriately be adjusted.

<Preparation of Initial Condensation Product>

Then, the initial condensation product is prepared by causing a reaction of at least one compound selected from the group consisting of urea, thiourea, melamine, benzoguanamine, acetoguanamine, and cyclohexylguanamine (hereinafter sometimes referred to as the "amino compound") with formaldehyde.

The initial condensation product obtained by the reaction of the amino compound and formaldehyde is a compound to be a precursor of an "amino resin" (i.e., urea resin, melamine resin, or guanamine resin). Using the specific initial condensation product, the inner shell made of an amino resin can be formed, and mercapto groups can be introduced into the amino resin produced from the initial condensation product by causing the reaction in the presence of a compound having a mercapto group(s) and either a carboxy or sulfo group(s).

With respect to the initial condensation product, (1) when at least one of urea and thiourea (hereinafter sometimes referred to as the "urea compound") is reacted with formaldehyde, there can be obtained an initial condensation product giving a urea resin; (2) when melamine is reacted with formaldehyde, there can be obtained an initial condensation product giving a melamine resin; and (3) when at least one of benzoguanamine, acetoguanamine, and cyclohexylguanamine (hereinafter sometimes referred to as the "guanamine compound") is reacted with formaldehyde, there can be obtained an initial condensation product giving a guanamine resin. Moreover, (4) when at least two of the urea compound, melamine, and the guanamine compound are reacted with formaldehyde, there can be obtained an initial condensation product giving a resin containing at least two types of urea resin, melamine resin, and guanamine resin. These initial condensation products (1) to (4) may be used alone, or two or more of these initial condensation products (1) to (4) may also be used in combination.

In general, the reaction of the amino compound and formaldehyde is carried out using water as a solvent. Therefore, the reaction may be carried out, for example, by a method of mixing the amino compound with an aqueous formaldehyde solution and carrying out the reaction, or by a method of preparing an aqueous formaldehyde solution by the addition of water to trioxane or p-formaldehyde, mixing the amino compound with the aqueous formaldehyde solution thus obtained, and carrying out the reaction. From economical points of view, e.g., in terms of no need to prepare an aqueous formaldehyde solution and the availability of an aqueous formaldehyde solution, there may be preferred a method of mixing the amino compound with an aqueous formaldehyde solution and carrying out the reaction. Moreover, when the amino compound is mixed with an aqueous formaldehyde solution, both of adding the amino compound to the aqueous formaldehyde solution and adding the aqueous formaldehyde solution to the amino compound may be possible. The condensation reaction may preferably be carried out under stirring using any of the heretofore known stirring apparatuses.

The amino compound may preferably be urea, melamine, and benzoguanamine, more preferably melamine, a combination of melamine and urea, and a combination of melamine and benzoguanamine.

As the amino compound, another amino compound may be used, besides the above amino compound. Examples of another amino compound may include capriguanamine, amerine, ameride, ethylene urea, propylene urea, and acetylene urea. When another amino compound is used, amino compounds including another amino compound are used as starting materials for the initial condensation product.

With respect to the reaction for obtaining an initial condensation product, the addition amounts of the amino compound and formaldehyde are not particularly limited, but they may preferably be, by the mole ratio of amino compound/formaldehyde, from 1/0.5 to 1/10, more preferably from 1/1 to 1/8, and still more preferably from 1/1 to 1/6. If the mole ratio of amino compound/formaldehyde is lower than 1/10, the amount of unreacted formaldehyde may be increased, and therefore, the reaction efficiency may be decreased. To the contrary, if the mole ratio of amino compound/formaldehyde is higher than 1/0.5, the amount of unreacted amino compound may be increased, and therefore, the reaction efficiency may be decreased. In this connection, if water is used as the solvent for the reaction, the addition amounts of the amino compound and formaldehyde, relative to the solvent, that is, the concentrations of the amino compound and formaldehyde at the time of feed are more desirable to be higher, so long as there is no obstacle in the reaction.

The reaction temperature for carrying out the reaction for obtaining an initial condensation product is not particularly limited, but it may preferably be from 55° C. to 85° C., more preferably from 60° C. to 80° C., and still more preferably from 65° C. to 75° C., and when the end point of the reaction is confirmed, the reaction may be finished by an operation such as cooling of a reaction solution to normal temperature (e.g., from 25° C. to 30° C.). Thus, the reaction solution containing an initial condensation product can be obtained. The reaction time is not particularly limited, but it may appropriately be set in accordance with the feed amounts.

<Formation of Inner Shell>

Then, a condensation reaction is carried out using an initial condensation product in a water-based medium containing a core substance dispersed therein in the presence of a compound having a mercapto group(s) (—SH) and either a carboxyl group(s) (—COOH) or a sulfo group(s) (—SO₃H) (hereinafter sometimes referred to as the "thiol compound") to form an inner shell made of a mercapto group-containing amino resin on the surface of the core substance. This operation gives microcapsules each enclosing a dispersion containing electrophoretic particles and a solvent in an inner shell made of a mercapto group-containing amino resin.

The addition amount of an initial condensation product is not particularly limited, but it may preferably be from 0.5 to 10 parts by mass, more preferably from 0.5 to 5 parts by mass, and still more preferably from 0.5 to 3 parts by mass, relative to 1 part by mass of a core substance. The thickness of an inner shell can easily be controlled by adjusting the addition amount of an initial condensation product. If the addition amount of an initial condensation product is lower than 0.5 parts by mass, it may become impossible to form a sufficient amount of an inner shell or the thickness of an inner shell may be narrowed, so that the strength and impermeability of the inner shell may be lowered. To the contrary, if the addition amount of an initial condensation product is higher than 10 parts by mass, the thickness of an inner shell may become thick, so that the flexibility and transparency of the inner shell may be lowered.

A method of adding an initial condensation product to a water-based medium is not particularly limited, but either of collective addition or successive addition (continuous addition and/or intermittent addition) may be employed. The addition of an initial condensation product may be preferred to be carried out under stirring using any of the heretofore known stirring apparatuses.

The thiol compound to be used in the condensation reaction is not particularly limited, but examples of the thiol compound may include cysteine (2-amino-3-mercaptoproponic acid), mercaptoacetic acid, mercaptopropionic acid, mercaptobenzoic acid, mercaptosuccinic acid, mercaptoethanesulfonic acid, mercaptopropanesulfonic acid, their alkali metal salts, their alkaline earth metal salts, and their ammonium salts. These thiol compounds may be used alone, or two or more of these thiol compounds may also be used in combination. In these thiol compounds, L-cysteine may be preferred from an economical point of view, e.g., in terms of availability.

The addition amount of the thiol compound is not particularly limited, but it may preferably be from 1 to 20 parts by mass, more preferably from 1 to 10 parts by mass, and still more preferably from 1 to 5 parts by mass, relative to 100 parts by mass of an initial condensation product. If the addition amount of the thiol compound is lower than 1 part by mass, since the amount of mercapto group to be introduced into the amino resin may be low, firm bonds with an epoxy resin forming an outer shell cannot be formed in some cases. To the contrary, if the addition amount of the thiol compound is higher than 20 parts by mass, the strength and impermeability of an inner shell may be lowered.

A method of adding the thiol compound to a water-based medium is not particularly limited, but it may be preferred to be carried out by adding the initial condensation product to the water-based medium containing a core substance dispersed therein, sufficiently stirring the mixture thus obtained, and then dropwise adding the thiol compound in form of an aqueous solution. The condensation reaction may be preferred to be carried out under stirring using any of the heretofore known stirring apparatuses.

In the production process of the present invention, an inner shell is formed on the surface of a core substance by carrying out the condensation reaction of an initial condensation product in the presence of the thiol compound in a water-based medium containing the core substance dispersed therein. Specifically, while the amino group of the initial condensation product and the carboxyl group or sulfo group of the thiol compound are reacted with each other, the condensation reaction of the initial condensation product is carried out to deposit a mercapto group-containing amino resin on the surface of a core substance to form an inner shell.

The reaction temperature for carrying out the condensation reaction is not particularly limited, but it may preferably be from 10° C. to 150° C., more preferably from 20° C. to 100° C., and still more preferably from 30° C. to 80° C. If the reaction temperature for carrying out the condensation reaction is lower than 10° C., the condensation reaction is slow, so that an inner shell cannot sufficiently be formed. To the contrary, if the reaction temperature for carrying out the condensation reaction is higher than 150° C., the formation of an inner shell may be inhibited. The reaction time is not particularly limited and it may appropriately be set in accordance with the feed amounts and the reaction temperature for carrying out the condensation reaction, but it may usually be in a range of from several minutes to several ten hours. In general, if the reaction temperature for carrying out the condensation reaction is low, the reaction time may be set to be long, and to the contrary, if the reaction temperature for carrying out the condensation reaction is high, the reaction time may be set to be short.

After the condensation reaction is carried out, an aging period may be provided. The temperature for aging is not particularly limited, but it may preferably be a temperature equal to or slightly higher than the reaction temperature for carrying out the condensation reaction. The aging period is not particularly limited, but it may preferably be from 0.5 to 5 hours, more preferably from 1 to 3 hours.

The present inventors have found that the capsule strength of microcapsules can be improved by appropriately adjusting the temperature and time for carrying out the condensation reaction and the temperature and period for aging after that. To improve the capsule strength of microcapsules, the reaction temperature for carrying out the condensation reaction of an initial condensation product may be set to be high within the above range and/or the temperature for aging is set to be higher than the reaction temperature and/or the aging period may be set to be long within the above range.

After an inner shell is formed, the microcapsules thus obtained may be separated from the water-based medium by any of the heretofore known methods, for example, suction filtration and spontaneous filtration, if necessary, but since an amino resin forming an inner shell is very fragile and may possibly be broken or damaged by weak impact or pressure, it may be preferred to subject the microcapsules to the next process without separating the microcapsules from the water-based medium.

<Classifying and Washing of Microcapsules>

The microcapsules obtained at the step of forming an inner shell may be preferred to be classified to obtain microcapsules in a narrow particle size distribution and/or may be preferred to be washed to remove impurities to improve product quality.

The classification of microcapsules may be carried out in such a manner that the microcapsules have a desired particle diameter or particle size distribution by any of the heretofore known methods, for example, sieving, filtration, centrifugal precipitation, or spontaneous precipitation of a dispersion containing the microcapsules in a water-based medium as it is or after dilution with an arbitrary water-based medium. In this connection, for microcapsules having a relatively great particle diameter, a sieving method is effective.

The washing of microcapsules may be carried out by repeating the following operations: precipitating the microcapsules by any of the heretofore known methods, for example, centrifugal precipitation or spontaneous precipitation of a dispersion containing the microcapsules in a water-based medium as it is or after dilution with an arbitrary water-based medium; discarding the supernatant solution; recovering the precipitate; and again dispersing the precipitate in an arbitrary water-based medium. For microcapsules having a relatively great particle diameter, it may be preferred to employ spontaneous precipitation in order to avoid the breakage or damage of the microcapsules.

<Formation of Outer Shell>

Then, after microcapsules each enclosing a core substance in an inner shell are dispersed in a water-based medium, an epoxy group-containing compound (hereinafter sometimes referred to as the "epoxy compound") is added, and an outer shell made of an epoxy resin is formed on the outer surface of the inner shell. This operation gives microcapsules each enclosing a dispersion containing electrophoretic particles and a solvent in a shell having an inner shell made of a mercapto group-containing amino resin and an outer shell made of an epoxy resin.

The water-based medium for dispersing microcapsules each enclosing a core substance in an inner shell may include water-based mediums recited above as the water-based medium for dispersing the core substance when the inner shell is formed. Since microcapsules each enclosing a core substance in an inner shell can be obtained in the form of a dispersion of the microcapsules in the water-based medium, the microcapsules may be subjected, without being separated or dispersed again in a water-based medium, to the step of forming an outer shell in the form of a dispersion of the microcapsules in the water-based medium as it is or after concentration or dilution.

The epoxy compound is not particularly limited, but there may be preferred water-soluble epoxy compounds having two or more epoxy groups in one molecule, of which examples may include sorbitol polyglycidyl ether, sorbitan polyglycidyl ether, polyglycerol polyglycidyl ether, pentaerythritol polyglycidyl ether, triglycidyltris(2-hydroxyethyl)isocyanurate, trimethylolpropane polyglycidyl ether, neopentyl glycol diglycidyl ether, polyethylene glycol diglycidyl ether, polypropylene glycol diglycidyl ether, and adipic acid diglycidyl ether. These epoxy compounds may be used alone, or two or more of these epoxy compounds may also be used in combination.

The mass average molecular weight of the epoxy compound may preferably be from 300 to 100,000, more preferably from 300 to 75,000, and still more preferably from 300 to 50,000. If the mass average molecular weight of the epoxy compound is lower than 300, it may become impossible to obtain an outer shell having sufficient strength. To the contrary, if the mass average molecular weight of the epoxy compound is higher than 100,000, the viscosity of the reaction system may be increased to make stirring difficult.

The addition amount of the epoxy compound is not particularly limited, but it may preferably be from 0.5 to 10 parts by mass, more preferably from 0.5 to 5 parts by mass, and still more preferably from 0.5 to 3 parts by mass, relative to 1 part by mass of a core substance. The thickness of an outer shell can easily be controlled by adjusting the addition amount of the epoxy compound. If the addition amount of the epoxy compound is lower than 0.5 parts by mass, it may become impossible to form a sufficient amount of an outer shell, or the thickness of an outer shell may be narrowed, so that the strength of the outer shell may be lowered. To the contrary, if the addition amount of the epoxy compound is greater than 10 parts by mass, the thickness of an outer shell may become thick, so that the flexibility and transparency of the outer shell may be lowered.

A method of adding the epoxy compound to a water-based medium is not particularly limited, but both of collective addition or successive addition (continuous addition and/or intermittent addition) may be employed. The addition of an initial condensation product may be preferred to be carried out under stirring using any of the heretofore known stirring apparatuses after microcapsules each enclosing a core substance in an inner shall are dispersed in the water-based medium.

When an outer shell made of an epoxy resin is formed, a reaction of the epoxy compound with a crosslinking agent may be carried out. A reaction of the epoxy compound with a crosslinking agent can improve the strength of an outer shell, and therefore, the strength of shells, so that the breakage or damage of the shells can effectively be suppressed when microcapsules are thereafter separated or washed.

The crosslinking agent is not particularly limited, but examples of the crosslinking agent may include sodium diethyldithiocarbamate (including its hydrate), diethylammonium diethyldithiocarbamate (including its hydrate), dithiooxalic acid, and dithiocarbonic acid. These crosslinking agents may be used alone, or two or more of these crosslinking agents may also be used in combination.

The addition amount of a crosslinking agent is not particularly limited, but it may preferably be from 1 to 100 parts by mass, more preferably from 5 to 90 parts by mass, and still more preferably from 10 to 80 parts by mass, relative to 100 parts by mass of the epoxy compound. If the addition amount of a crosslinking agent is lower than 1 part by mass, it may become impossible to sufficiently improve the strength of an outer shell. To the contrary, if the addition amount of a crosslinking agent is higher than 100 parts by mass, since the crosslinking agent may react on the epoxy group of the epoxy compound to an excess extent, the flexibility of an outer shell may be decreased.

A method of adding a crosslinking agent to a water-based medium may be a method of adding a crosslinking agent together with the epoxy compound or a method of adding a crosslinking agent before or after the addition of the epoxy compound, and is not particularly limited, but it may be preferred to dropwise add a crosslinking agent in the form of an aqueous solution under stirring after a while from the addition of the epoxy compound in the form of an aqueous solution to a water-based medium in which microcapsules each enclosing a core substance in an inner shell are dispersed.

When an outer shell made of an epoxy resin is formed, an epoxy-melamine condensation product may be added in addition to the epoxy compound. The addition of an epoxy-melamine condensation product can improve the impermeability of an outer shell, and therefore, the impermeability of shells, so that microcapsules can be provided with higher performance.

The epoxy-melamine condensation product may be an initial condensation product produced from the epoxy compound, melamine, and formaldehyde by any of the heretofore known methods, and is not particularly limited, but it can further be reacted with at least one compound selected from the group consisting of urea, thiourea, benzoguanamine, acetoguanamine, and cyclohexylguanamine. Preferred examples of the epoxy-melamine condensation product may include a condensation product produced by the reaction of a compound, which is obtained by the reaction of the epoxy compound with urea, with an initial condensation product, which is obtained by the reaction of melamine, urea, and formaldehyde.

The addition amount of an epoxy-melamine condensation product is not particularly limited, but it may preferably be from 0 to 10 parts by mass, more preferably from 0 to 8 parts by mass, and still more preferably from 0 to 5 parts by mass, relative to 1 part by mass of the epoxy compound. If the addition amount of an epoxy-melamine condensation product is greater than 10 parts by mass, an outer shell may become fragile, so that the strength of the outer shell may be decreased.

A method of adding an epoxy-melamine condensation product to a water-based medium may be carried out, together with the addition of the epoxy compound, or before or after the addition of the epoxy compound, and is not particularly limited, but it may be preferred to add an epoxy-melamine condensation product in the form of an aqueous solution after a while from the addition of the epoxy compound in the form of an aqueous solution to a water-based medium in which microcapsules each enclosing a core substance in an inner shell are dispersed. When the reaction of a crosslinking agent is carried out, it may be preferred to dropwise add the crosslinking agent in the form of an aqueous solution after a while from the addition of an epoxy-melamine condensation product in the form of an aqueous solution.

The temperature for forming an outer shell is not particularly limited, but it may preferably be from 10° C. to 150° C., more preferably from 20° C. to 100° C., and still more preferably from 30° C. to 80° C. If the temperature for forming an outer shell is lower than 10° C., the reaction of the epoxy compound is slow, so that an outer shell cannot sufficiently be formed. To the contrary, if the temperature for forming an outer shell is higher than 150° C., the formation of an outer shell may be inhibited. The reaction time for forming an outer shell is not particularly limited and it may appropriately be set in accordance with the feed amounts and the reaction temperature for forming an outer shell, but it may be usually in a range of from several minutes to several ten hours. In general, if the temperature for forming an outer shell is low, the time for forming an outer shell may be set to be long, and to the contrary, if the temperature for forming an outer shell is high, the time for forming an outer shell may be set to be short.

After an outer shell is formed, an aging period may be provided. The temperature for the aging is not particularly limited, but it may preferably be a temperature equal to or slightly higher than the temperature for forming an outer shell. The aging period is not particularly limited, but it may preferably be from 0.5 to 5 hours, more preferably from 1 to 3 hours.

The present inventors have found that the capsule strength of microcapsules can be improved by appropriately adjusting the temperature and time for forming an outer shell and the temperature and period for aging after that. To improve the capsule strength of microcapsules, the temperature for forming an outer shell may be set to be high within the above range and/or the temperature for aging is set to be higher than the temperature for forming an outer shell and/or the aging period may be set to be long within the above range.

After an outer shell is formed, the microcapsules thus obtained may be separated from the water-based medium by any of the heretofore known methods, for example, suction filtration and spontaneous filtration, if necessary, but since the solvent of a core substance may leak and be evaporated, if the microcapsules are kept in a dry state, and it results in the deformation of the microcapsules, it may be preferred to subject the microcapsules to the next process without separating the microcapsules from the water-based medium.

The microcapsules obtained at the step of forming an outer shell may be preferred to be classified to obtain microcapsules in a narrow particle size distribution and/or may be preferred to be washed to remove impurities to improve product quality.

The classification and washing of microcapsules can be carried out in the same manner for microcapsules obtained at the step of forming an inner shell, and therefore, their explanation is omitted herein.

<Use and Preservation of Microcapsules>

In the production process of the present invention, the microcapsules are finally obtained in the form of a dispersion in a water-based medium. The microcapsules thus obtained are microcapsules for electrophoretic display devices, and therefore, they are used for producing an electrophoretic display device. To produce an electrophoretic display device, at first, a sheet for electrophoretic display devices is produced. In this case, the microcapsules are prepared in the form of a coating solution by being mixed with a binder resin. The microcapsules may be separated from the water-based medium, but the microcapsules may preferably be used in the form of a filter cake having a content of the water-based medium in a range of preferably from 15% to 45%, more preferably from 20% to 40%, and still more preferably from 25% to 35%, after the dispersion is filtered by any of the heretofore known filtration apparatuses. The sheet for electrophoretic display devices and its production process will be described below in detail.

In the case where the microcapsules thus obtained are preserved, it is preferred to preserve the microcapsules in the form of a coating solution, which is a mixture of the microcapsules and a binder resin and/or in the form of a sheet for electrophoretic display devices, which is obtained by applying the coating solution to a PET film with ITO.

<<Sheet for Electrophoretic Display Devices>>

The sheet for electrophoretic display devices according to the present invention (hereinafter sometimes referred to as the "display sheet") comprises a layer containing the microcapsules of the present invention and a binder resin. In the display sheet of the present invention, the microcapsules are arranged in a manner of forming a plane-like form as a whole and fixed by the binder resin so as to keep the arrangement.

<Binder Resin>

The binder resin is not particularly limited, but organic binder resins may preferably be used. Examples of the organic binder resins may include synthetic resin binders such as acrylic resins, polyester resins, fluorine resins, alkyd resins, amino resins, vinyl resins, epoxy resins, polyamide resins, urethane resins, unsaturated polyester resins, phenol resins, polyolefin resins, silicone resins, acryl-silicone resins, xylene resins, ketone resins, rosin-modified maleic acid resins, liquid-type polybutadiene, and cumarone resins; binders of natural or synthetic rubbers such as ethylene-propylene copolymer rubbers, polybutadiene rubbers, styrene-butadiene rubbers, and acrylonitrile-butadiene copolymer rubbers; natural resin binders such as shellac, rosin (pine resin), ester gum, cured rosin, decolorized shellac, and white shellac; and thermoplastic or thermosetting polymer binders such as cellulose nitrate, cellulose acetate butylate, cellulose acetate, ethyl cellulose, hydroxypropylmethyl cellulose, and hydroxyethyl cellulose. In this connection, the synthetic resin binders may be plastic (thermoplastic) binders, or curable (thermosetting, ultraviolet curable, electron beam curable, and moisture curable) binders such as those of the acrylic type, methacrylic type, and epoxy type. These organic binder resins may be used alone, or two or more of these organic binder resins may also be used in combination.

The type of the binder resin is not particularly limited and examples thereof may be binder resins of the solvent-soluble type, the water-soluble type, the emulsion type, and the dispersion type (using an arbitrary solvent such as water or organic solvents).

In these types, examples of the water-soluble type binder may be water-soluble alkyd resins, water-soluble acryl-modified alkyd resins, water-soluble oil-free alkyd resins (water-soluble polyester resins), water-soluble acrylic resins, water-soluble epoxy ester resins, and water-soluble melamine resins. Examples of the emulsion type binder may be alkyl (meth)acrylate copolymer dispersions, vinyl acetate resin emulsions, vinyl acetate copolymer resin emulsions, ethylene-vinyl acetate copolymer resin emulsions, acrylic acid ester (co)polymer resin emulsions, styrene-acrylic acid ester (co)polymer resin emulsions, epoxy resin emulsions, urethane resin emulsions, acrylic-silicone emulsions, and fluorine resin emulsions.

<Base Material of Display Sheet>

The display sheet of the present invention may be a sheet containing the microcapsules of the present invention and a binder resin, or a sheet containing other constituent parts and components in addition to the microcapsules of the present invention and a binder resin, and is not particularly limited. The latter display sheet may be a sheet obtained by forming a layer containing the microcapsules of the present invention and a binder resin (hereinafter sometimes referred to as the "microcapsule layer") on a film- or sheet-like base material or further putting another film- or sheet-like base material in such a manner that the microcapsule layer is sandwiched after the formation of the microcapsule layer on the film- or sheet-like base material (e.g., the microcapsule layer is laminated between the film- or sheet-like base materials), and accordingly, combining the microcapsule layer with another base material. Since the production process is easy and the sheet can be produced while the properties of the microcapsules of the present invention are preserved easily, the latter form is preferred.

The display sheet of the present invention is a display sheet for electrophoretic display devices, and therefore, in the case where the sheet has a film- or sheet-like base material (in the case of the latter display sheet as described above), a conductive film is usually used as the base material. Specific examples of the conductive film may include electrode films which can be used as the electrodes of an electrophoretic display device. The electrode film may be, for example, a non-transparent electrode film or a transparent electrode film (e.g., a PET film with ITO) and is not particularly limited, but it may preferably be a transparent electrode film and particularly in the case where two opposed electrode films are laminated while sandwiching a layer containing the microcapsules of the present invention and a binder resin as described above, at least one electrode film is required to be transparent.

<Process for Producing Display Sheet>

The process for producing the display sheet of the present invention is not particularly limited, but in general, as described below in detail, the process may preferably be employed, in which a coating solution is prepared by mixing the microcapsules of the present invention and a binder resin, and the coating solution is applied to the surface of a film- or sheet-like base material, followed by drying. In the case of obtaining a display sheet in which a microcapsule layer and a base material are combined, the sheet may be handled as it is after drying, whereas in the case of obtaining a display sheet including only a microcapsule layer, the microcapsule layer alone may be separated from the base material (by peeling or the like). In the case of obtaining a display sheet in which base materials are laminated while sandwiching a microcapsule layer, one base material is put on the coated face after drying and laminated thereon.

The concentration of the microcapsules in the coating solution is not particularly limited, but it may preferably be from 30% to 70% by mass, more preferably from 30% to 60% by mass, and still more preferably from 30% to 55% by mass. If the concentration of the microcapsules is within the above range, it is made possible to obtain a display sheet in which the microcapsules of the present invention are densely arranged in a single layer on a base material, and if such a display sheet is used for an electrophoretic display device, an excellent product quality (display quality) can be obtained.

The viscosity of the coating solution is not particularly limited, but it may preferably be from 500 to 5,000 mPa·s, more preferably from 800 to 4,000 mPa·s, and still more preferably from 800 to 3,000 mPa·s. If the viscosity of the coating solution is within the above range, it is made possible to arrange the microcapsules of the present invention densely without air gaps in a single layer on a base material and finally form a coating film (coating layer) in which the microcapsules of the present invention are densely packed.

The coating solution may contain other components, if necessary, besides the microcapsules of the present invention and a binder resin. Examples of the other components may include viscosity modifiers, leveling agents, and defoaming agents. The addition amounts of other components may appropriately be set to an extent that the effects of the present invention are not adversely affected.

The method of applying a coating solution to a base material is not particularly limited and may be a method of applying a coating solution one by one to a base material using a coating apparatus such as an applicator and a blade coater or a method of continuously applying a coating solution to a base material using a continuous coating apparatus such as a multi-coater. These methods may appropriately be selected according to need.

The method of drying after the coating is not particularly limited and any of the heretofore known drying techniques and drying conditions may be employed.

The thickness of the display sheet of the present invention depends on the particle diameter of the microcapsules to be used, and therefore, it is not particularly limited. The thickness of a microcapsule layer may preferably be, for example, from 10 to 250 μm, more preferably from 10 to 180 μm, and still more preferably from 10 to 100 μm. If the thickness of a microcapsule layer is thinner than 10 μm, no sufficient display density can be obtained in display parts, and the display parts cannot be distinguished from non-display parts, when the display sheet of the present invention is used for an electrophoretic display device. To the contrary, if the thickness of a microcapsule layer is thicker than 250 μm, it is needed to increase a driving voltage in order to sufficiently exhibit the electrophoresis properties of electrophoretic particles in the dispersion enclosed in the microcapsules and it may result in inferiority in term of economy, when the display sheet of the present invention is used for an electrophoretic display device. When a film- or sheet-like base material is used, the thickness of the base material is not particularly limited, but may preferably be from several ten micrometers to several millimeters.

In the case where a laminated display sheet is obtained as the display sheet of the present invention, a method of lamination is not particularly limited and any of the heretofore known laminating techniques and laminating conditions can be employed.

In the case where the display sheet of the present invention is a laminated display sheet, in order to obtain an electrophoretic display device which can stably exhibit excellent display quality, generally, the display sheet is preferred to have sufficient adhesiveness (wide contact surface area) of the microcapsules of the present invention to both electrode films. If the adhesiveness to both electrode films is low, the response of electrophoretic particles may be lowered or the contrast may be decreased. To heighten the adhesiveness, it is supposed to increase the temperature and pressure for lamination. Moreover, with respect to the microcapsules to be used, the content ratios of components forming a shell may appropriately be set to increase flexibility and adhesiveness, and accordingly, the easiness of the adhesion of the microcapsules to the electrode films can further be heightened. In this case, even if conditions such as temperature and pressure at for lamination are moderated to a certain extent, sufficient adhesiveness can be obtained.

In the case where the display sheet of the present invention is a laminated display sheet, the interval of opposed electrode films is not particularly limited, but it may preferably be from 10 to 250 µm, more preferably from 10 to 180 µm, and still more preferably from 10 to 100 µm. If the interval of opposed electrode films is smaller than 10 µm, no sufficient display density can be obtained in display parts, and the display parts cannot be distinguished from non-display parts, when the display sheet of the present invention is used for an electrophoretic display device. To the contrary, if the interval of opposed electrode films is greater than 250 µm, it is needed to increase a driving voltage in order to sufficiently exhibit the electrophoresis properties of electrophoretic particles in the dispersion enclosed in the microcapsules and it may result in inferiority in term of economy, when the display sheet of the present invention is used for an electrophoretic display device.

<<Electrophoretic Display Device>>

The display sheet of the present invention can be used, for example, as the constituent element of a data displaying part for electrophoretic display devices. The electrophoretic display device of the present invention comprises a data displaying part, wherein the data displaying part comprises the sheet for electrophoretic display devices according to the present invention. The electrophoretic display device of the present invention is the same as any of the heretofore known electrophoretic display devices, except that the data displaying part comprises the sheet for electrophoretic display devices according to the present invention. For this reason, parts other than the data displaying part, for example, a driving circuit and an electric power supply circuit, may be constructed in the same manner as in the heretofore known electrophoretic display devices. In other words, the electrophoretic display device of the present invention can be obtained by constructing the data displaying part in any of the heretofore known electrophoretic display devices with the sheet for electrophoretic display devices according to the present invention. In the present invention, the data displaying part alone may be referred to as an electrophoretic display device by incorporating the driving circuit and the electric power supply circuit into an external circuit.

As the electrophoretic display device of the present invention, an electrophoretic display device comprising, as the constituent element of a data displaying part, a display sheet obtained by laminating a layer containing microcapsules and a binder resin between two opposed electrode films is preferably exemplified from the display sheets of the present invention. In such an electrophoretic display device, various constituent parts other than the display sheet (e.g., a driving circuit and an electric power supply circuit) may be those which are used in the heretofore known electrophoretic display devices, as described above.

The required display action in the electrophoretic display device of the present invention can be carried out by applying a controlled voltage to the opposed electrode films (e.g., applying a voltage only to the parts where desired images are to be displayed), thereby changing the oriented positions of electrophoretic particles in the microcapsules. If a driver layer including thin film transistors using amorphous silicon or polysilicon or organic transistors using organic molecules is formed in one electrode film, the display control can be carried out. Alternatively, without forming a driver layer, the display control may be carried out by an outer device. The means for display control may appropriately be selected depending on the applications of the electrophoretic display device and is not particularly limited.

<<Electronic Equipments>>

The electrophoretic display device obtained using the display sheet of the present invention can be used as a data displaying means for electronic equipments. The electronic equipment of the present invention comprises a displaying means, wherein the data displaying means comprises the electrophoretic display device of the present invention. The "data displaying means" as used herein refers to a means for displaying character data, image data, and the like. The electronic equipment of the present invention is the same as the heretofore known electronic equipments, except that the data displaying means comprises the electrophoretic display device of the present invention. Therefore, parts other than the data displaying means may be the same as those of the heretofore known electronic equipments. That is, the electronic equipment of the present invention can be obtained by replacing the data displaying means in any of the heretofore known electronic equipments with the electrophoretic display device of the present invention.

The electronic equipment to which the electrophoretic display device of the present invention can be applied is not particularly limited, so long as the electronic equipment comprises a data displaying means, and examples thereof may include personal computers, work stations, word processors, IC cards, IC tags, electronic notepads, electronic dictionaries, IC recorders, electronic books, electronic papers, electronic notebooks, electronic calculators, electronic newspapers, electronic white boards, direction boards, advertisement boards, various types of displays, TV sets, DVD players, digital still cameras, view finder-type or monitor direct view-type video cameras, car navigation systems, mobile phones, videophones, pagers, mobile terminals, POS terminals, and various kinds of equipments having touch panels. These electronic equipments have heretofore been known, and the electronic equipment of the present invention can be obtained by replacing their data displaying means with the electrophoretic display device of the present invention.

Examples

The present invention will be explained below in detail by reference to Examples, but the present invention is not limited to these Examples. The present invention can be put into practice after appropriate modifications or variations within a range meeting the gists described above and later, all of which are included in the technical scope of the present invention. In the following Examples, "%" means "% by mass" in the case of a concentration or a solid content.

First, the following will describe a method of measuring the particle diameter of electrophoretic particles, a method of measuring the particle diameter of microcapsules, a method of evaluating the preservation stability of microcapsules under various conditions, a production method of electrophoretic display devices, a method of measuring contrast, a method of measuring an amount of leakage current, a method of evaluating solvent resistance, a steel ball dropping test for electrophoretic display devices, and a method of measuring capsule strength.

<Particle Diameter of Electrophoretic Particles>

The particle diameter of electrophoretic particles was measured as their volume average particle diameter using a dynamic light scattering nanoparticle size analyzer (trade name: LB-500, available from HORIBA Ltd.).

<Particle Diameter of Microcapsules>

The particle diameter of microcapsules was measured as their volume average particle diameter using a laser scattering particle size distribution analyzer (trade name: LA-910, available from Horiba, Ltd.).

<Preservation Stability of Microcapsules>

With respect to the form of (A) a coating solution, which is a mixture of microcapsules and a binder resin, and the form of (B) a sheet for electrophoretic display devices, which is obtained by applying the coating solution to a PET film with ITO, each of the samples was preserved under an environment at 25° C. and 60% RH, and electrophoretic display devices were produced every 10 days and their contrast was measured to evaluate the preservation stability of the microcapsules on the basis of contrast changes.

<Production Method of Electrophoretic Display Devices>

An electrophoretic display device was produced by attaching a microcapsules-coated sheet (a sheet for electrophoretic display devices) with a coated part having a height of 5 cm and a width of 3 cm on a PET film with ITO having a height of 6 cm, a width of 4 cm, and a thickness of 75 µm (a counter electrode; trade name: Highbeam CH-22, available from Toray Industries, Inc.) (by fixing them at arbitrary two points with Cellotape (registered trademark)) in a state that an uncoated part (a conductive part) was left in one side, setting the attached sheet and film on a glass plate having a thickness of 2 mm, and laminating the sheet and film on the glass plate by passing them between two rolls.

The rolls were silicone rubber rolls having a roll diameter of 3 inch (about 7.62 cm), and the upper roll was heated by a heat medium to have the roll surface temperature of 120° C., rotated with a driving motor, and pressurized to the lower roll by air pressure of 0.2 mPa·s to keep 0 mm gap between the rolls. The lower roll was not heated and was rotated freely, and the roll position was fixed. The rolls were rotated at a feeding speed of 6 cm/min., and while the laminate face was set in the heated roll side, the attached sample was set on the glass plate and passed between the rolls.

<Contrast>

A direct current voltage of 40 V was applied between both electrodes of an electrophoretic display device for 0.4 seconds to carry out white display or black display, and the reflectance of each display was measured with a Macbeth spectroscopic densitometer (trade name: SpectroEye, available from GretagMacbeth), and the contrast was calculated according to the following equation:

$$\text{Contrast} = \text{reflectance of white display} / \text{reflectance of black display}.$$

In this connection, the reflectance of white display and the reflectance of black display were separately measured by applying a voltage with changed polarity, and each reflectance is defined as an average of measurement values obtained for the entire one side face of the electrophoretic display device.

<Amount of Leakage Current>

After each electrophoretic display device was left under an environment at 23° C. and 65% RH for 1 hour, a direct-current voltage of 40 V was applied to both electrodes of the electrophoretic display device for 2 minutes under an environment at the same temperature and the same humidity, and the amount of flowing current (i.e., the amount of leakage current before humidity resistance test) was measured using a high resistance meter.

Then, after the electrophoretic display device was left under an environment at 60° C. and 90% RH for 24 hours, the electrophoretic display device was left under an environment at 25° C. and 40% RH for 1 hour, and in the same manner as described above, the amount of flowing current between both electrodes (i.e., the amount of leakage current after humidity resistance test) was measured under an environment at the same temperature and the same humidity.

<Solvent Resistance>

A 20-mL sample tube was charged with 3 g of a filter cake of microcapsules and 10 g of a mixed solvent of ethanol/water=8/2 (by mass), and the content was mixed for 30 minutes and left for 24 hours, after which the microcapsules was sampled and the state of the microcapsules after solvent evaporation was observed using an optical microscope (trade name: digital microscope VHX-500, available from KEYENCE Corporation; magnification: from 500 to 2,000 times) and the solvent resistance of the microcapsules was evaluated on the following criteria:

A: no change is observed in the entire microcapsules;
B: there are some slightly dented microcapsules, but most of the microcapsules show no change;
C: slight dents are observed in the entire microcapsules;
D: considerable dents are observed in the entire microcapsules and most of the content came out.

<Steel Ball Dropping Test>

After each electrophoretic display device was put on a butadiene rubber sheet having a thickness of 3 mm, a steel ball having a diameter of 11 mm and a weight of 5.468 g was vertically dropped from an arbitrary height to the data displaying part of the electrophoretic display device, and the point where the steel ball hit was observed by an optical microscope.

<Capsule Strength>

One droplet of a dispersion obtained by diluting microcapsules with water was dropped on a slide glass and dried at 50° C. for 5 minutes. One microcapsule was selected from this sample for measurement, and the compressive strength was measured by a micro compression tester (trade name: MCT-W 500, available from Shimadzu Corporation) and the measured value was defined as the capsule strength. The measurement conditions were as follows: testing force, 9.8 mN; loading speed, 0.446 mN/sec.; holding time, 0 seconds; and indenter diameter, 100 µm.

Then, the following will describe synthesis examples of materials of an inner shell made of a mercapto group-containing amino resin, materials of an outer shell made of an epoxy resin, a dispersion for electrophoretic display devices, and materials of wall layers, for comparison, made of an ethylene oxide chain-containing amino resin.

Synthesis Example 1

A 100-mL round-bottomed separable flask was charged with 7.5 g of melamine, 7.5 g of urea, 30 g of a 37% aqueous formaldehyde solution, and 3 g of 25% ammonia water, and the mixture was heated to 70° C. under stirring. After the mixture was kept at the same temperature for 1.5 hours, the mixture was cooled to 30° C. to obtain an aqueous solution (A-1) with a solid content of 54.4% containing a melamine-urea-formaldehyde initial condensation product.

Synthesis Example 2

A 100-mL round-bottom separable flask was charged with 13 g of melamine, 2 g of benzoguanamine, 30 g of a 37% aqueous formaldehyde solution, and 3 g of 25% ammonia water, and the mixture was heated to 75° C. under stirring. After it was observed that the entire mixture became transparent when it reached 75° C., the mixture was immediately cooled to 30° C. to obtain an aqueous solution (A-2) with a solid content of 54.4% containing a melamine-benzoguanamine-formaldehyde initial condensation product.

Synthesis Example 3

A 100-mL round-bottom separable flask was charged with 15 g of melamine, 30 g of a 37% aqueous formaldehyde solution, and 3 g of 25% ammonia water, and the mixture was heated to 70° C. under stirring. After the mixture was kept at the same temperature for 15 minutes, the mixture was cooled to 30° C. to obtain an aqueous solution (A-3) with a solid content of 54.4% containing a melamine-formaldehyde initial condensation product.

Synthesis Example 4

A 300-mL four-necked separable flask was charged with 125 g of polyglycerol polyglycidyl ether (trade name: Denacol EX-521 (having a mass average molecular weight of 732 and a solubility in water of 100%), available from Nagase Chemtex Corporation), as an epoxy compound, and 125 g of water, and the mixture was stirred for dissolution. To this solution was added 50 g of a 50% aqueous urea solution, and the mixture was reacted at 40° C. for 1 hour to obtain an aqueous solution (B-1) with a solid content of 50% containing a compound obtained by the reaction of the epoxy compound with urea.

A 100-mL four-necked separable flask was charged with 2.5 g of melamine, 0.5 g of urea, 20 g of a 37% aqueous formaldehyde solution, and 2 g of 25% ammonia water, and the mixture was reacted at 70° C. for 45 minutes, to which 24 g of the aqueous solution (B-1) was added, and the mixture was further reacted at the same temperature for 15 minutes and cooled to 25° C. to obtain an aqueous solution (B-2) with a solid content of 45.7% containing a melamine-urea-formaldehyde initial condensation product.

Synthesis Example 5

A 300-mL separable flask equipped with stirring blades, a thermometer, and a condenser tube was charged with 2 g of an acrylic polymer (having a mass average molecular weight of 3,300) made of dodecyl methacrylate, 2-ethylhexyl acrylate, and glycidyl methacrylate (their composition ratio being 80:15:5), 20 g of carbon black (trade name: MA-100 R, available from Mitsubishi Chemical Corporation), and 78 g of Isoper M (registered trade name) (available from Exxon Kagaku K.K.), and further charged with 800 g of zirconia beads having a diameter of 1 mm.

While the mixture was stirred at a rotation speed of 300 rpm, a polymer grafting treatment was carried out by causing a reaction at 160° C. for 2 hours. After the treatment, further 100 g of Isoper M (registered trade name) was added, and the mixture was sufficiently mixed. After that, the zirconia beads were separated to obtain 150 g of a dispersion with a solid content of 11% containing carbon black subjected to the polymer grafting treatment (the epoxy groups of the acrylic polymer were reacted here with the carboxyl groups existing on the surface of the carbon black).

The particle diameter of electrophoretic particles contained in this dispersion was measured, and it was found that their volume average particle diameter was 0.2 μm.

On the other hand, a 300-mL separable flask equipped with stirring blades was charged with 50 g of titanium oxide (trade name: Tipaque CR 90, available from Ishihara Sangyo Kaisha, Ltd.), 5 g of an acrylic polymer (having a mass average molecular weight of 6,800) made of dodecyl methacrylate, 2-ethylhexyl acrylate, and methacryloxypropyltrimethoxysilane (their composition ratio being 80:15:5), and 100 g of hexane, and the flask was put in an ultrasonic bath (trade name: BRANSON 5210, available from Yamato Kagaku Co., Ltd.) at 55° C., followed by ultrasonic dispersion treatment under stirring for 2 hours.

This separable flask was transferred to a hot water bath at 90° C., and the solvent was removed. The titanium oxide which became in a powder state was taken out of the flask, transferred to a tray, and then heat treated in a dryer at 150° C. for 5 hours.

The titanium oxide thus heat treated was dispersed in 100 g of hexane, and separated by centrifugation using a centrifugal separator, followed by washing. After this operation was repeated three times, the titanium oxide was dried at 100° C.

A 300-mL separable flask was charged with 50 g of the titanium oxide thus washing treated and 50 g of Isoper M (registered trade name), and the flask was put in an ultrasonic bath (trade name: BRANSON 5210, available from Yamato Kagaku Co., Ltd.) at 55° C., followed by ultrasonic dispersion treatment under stirring for 2 hours, to obtain a dispersion with a solid content of 50% containing titanium oxide subjected to the polymer grafting treatment (the silyl groups of the acrylic polymer were reacted here with the hydroxy groups existing on the surface of the titanium oxide).

The particle diameter of electrophoretic particles contained in this dispersion was measured, and it was found that their volume average particle diameter was 0.5 μm.

A 200-mL mayonnaise bottle was charged with 6 g of the above dispersion of carbon black subjected to the polymer grafting treatment, 75 g of the above dispersion of titanium oxide subjected to the polymer grafting treatment, and 19 g of Isoper M (registered trade name), and the content was sufficiently mixed to obtain a dispersion (C-1) for electrophoretic display devices, having electrophoretic particle concentrations of 0.66% for carbon black and 37.5% for titanium oxide.

Synthesis Example 6

A 300-mL separable flask was charged with 14.5 g of polyethylene imine (trade name: Epomin SP006 (having a mass average molecular weight of 600), available from Nippon Shokubai Co., Ltd.) and 36.4 g of water, to which an aqueous solution previously prepared by dissolving 24.3 g of lauryl alcohol polyoxyethylene (EO addition number: 22) glycidyl ether (developed product: Denacol FCA-014 (having a mass average molecular weight of 1,279 and a solubility in water of 100%), available from Nagase Chemtex Corporation), as an epoxy compound, in 80 g of water was added dropwise under stirring for 10 minutes. The liquid temperature during the dropwise addition was kept at 25° C. or lower. After completion of the dropwise addition, the mixture was continuously stirred for 30 minutes, then heated to 70° C. and kept for 2 hours. The mixture was cooled to room temperature to obtain an aqueous solution (CA-1) with a solid content of 25% containing a compound obtained by the reaction of the polyethylene imine and the epoxy compound.

Then, the following will describe production examples of microcapsules for electrophoretic display devices, sheets for electrophoretic display devices, and electrophoretic display devices, according to the present invention, as well as microcapsules for electrophoretic display devices for comparison, sheets for electrophoretic display devices for comparison, and electrophoretic display devices for comparison.

Example 1

A 500-mL flat-bottomed separable flask was charged with 120 g of an aqueous solution containing 20 g of gum arabic dissolved therein, and 100 g of the dispersion for electrophoretic display devices was added, while being stirred at 600 rpm using a disper (trade name: ROBOMICS, available from PRIMIX Corporation). After that, the stirring speed was changed to 1,600 rpm, followed by stirring for 2 minutes, and the stirring speed was changed to 1,000 rpm, and 100 g of water was added to obtain a suspension.

The suspension was put in a 300-mL four-necked separable flask equipped with a thermometer and a condenser tube, and while being kept at 40° C. and stirred by paddle blades, 48 g of the aqueous solution (A-1) was added. After 15 minutes, 100 g of an aqueous solution containing 2 g of L-cysteine dissolved therein was added dropwise by a dropping funnel over 5 minutes. While being kept at 40° C., the reaction was carried out for 4 hours, and the temperature was then increased to 50° C., and aging was carried out for 2 hours to obtain a dispersion of microcapsules each enclosing the dispersion (C-1) for electrophoretic display devices in an inner shell made of a mercapto group-containing amino resin.

The dispersion thus obtained was cooled to 25° C. and filtered with a standard sieve having meshes of 75 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

Then, water was added to the microcapsules to obtain 200 g of a dispersion, and the dispersion was transferred to the above flat-bottomed separable flask and heated to 40° C. under stirring.

To the microcapsule dispersion was added 100 g of an aqueous solution containing 15 g of polyglycerol polyglycidyl ether (trade name: Denacol EX-521 (having a mass average molecular weight of 732 and a solubility in water of 100%), available from Nagase Chemtex Corporation), as an epoxy compound, dissolved therein. After 30 minutes, 50 g of an aqueous solution containing 2 g of sodium diethyldithiocarbamate dissolved therein was added dropwise by a dropping funnel over 5 minutes. While being kept at 40° C., the reaction was carried out for 3 hours, and the temperature was then increased to 50° C., and aging was carried out for 1 hour to obtain a dispersion of microcapsules each enclosing the dispersion (C-1) for electrophoretic display devices in a shell having an inner shell made of a mercapto group-containing amino resin and an outer shell made of an epoxy resin and formed on the outer surface of the inner shell.

The dispersion thus obtained was cooled to 25° C. and filtered with a standard sieve having meshes of 53 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The particle diameter of the thus obtained microcapsules (1) for electrophoretic display devices was measured, and it was found that their volume average particle diameter was 40.7 μm. The result is shown in Table 1.

The microcapsules (1) for electrophoretic display devices were suction-filtered to obtain a microcapsule paste (1) for electrophoretic display device with a solid content of 65%.

A coating solution was obtained by adding 6 g of a resin solution with a solid content of 50%, in which an alkali-soluble acrylic resin (trade name: WR301A, available from Nippon Shokubai Co., Ltd.) was dissolved in ammonia, to 30 g of the paste obtained above, and mixing the mixture by a hybrid defoaming mixer (trade name: Awatori Rentaro (registered trademark) AR-100, available from THINKY Corporation) for 10 minutes.

The coating solution was applied to a PET film with ITO by an applicator and dried at 90° C. for 10 minutes to obtain a sheet (1) for electrophoretic display devices.

Using the sheet (1) for electrophoretic display devices, an electrophoretic display device was produced by the above-described method, and the contrast and the amount of leakage current were measured. Moreover, the preservation stability in the respective states of the microcapsules (1) for electrophoretic display devices was also evaluated. Further, the steel dropping test for the electrophoretic display device was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. Further, the capsule strength of the microcapsules (1) for electrophoretic display devices was measured by a micro compression tester, and it was found to be 4.6 MPa. The results are shown in Tables 1 and 2.

Example 2

Microcapsules (2) for electrophoretic display devices were obtained in the same manner as described in Example 1, except that a suspension was obtained by changing the stirring speed, by the disper, of 1,600 ppm to 1,800 rpm and the aqueous solution (A-2) was used in place of the aqueous solution (A-1) for forming an inner shell.

The particle diameter of the thus obtained microcapsules (2) for electrophoretic display devices was measured, and it was found that their volume average particle diameter was 26.6 μm. The result is shown in Table 1. Moreover, using the thus obtained microcapsules (2) for electrophoretic display devices, a sheet (2) for electrophoretic display devices was obtained in the same manner as described in Example 1.

Using the sheet (2) for electrophoretic display devices, an electrophoretic display device was produced by the above-described method, and the contrast and the amount of leakage current were measured. Moreover, the preservation stability in the respective states of the microcapsules (2) for electrophoretic display devices was also evaluated. Further, the steel dropping test for the electrophoretic display device was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. Further, the capsule strength of the microcapsules (2) for electrophoretic display devices was measured by a micro compression tester, and it was found to be 4.0 MPa. The results are shown in Tables 1 and 2.

Example 3

Microcapsules (3) for electrophoretic display devices were obtained in the same manner as described in Example 1, except that the aqueous solution (A-3) was used in place of the aqueous solution (A-1) for forming an inner shell, and 49 g of the aqueous solution (B-2) was added after 15 minutes from the addition of the epoxy compound, and further after 30 minutes, 50 g of an aqueous solution containing 1 g of sodium diethyldithiocarbamate dissolved therein was added dropwise using a dropping funnel over 5 minutes.

The particle diameter of the thus obtained microcapsules (3) for electrophoretic display devices was measured, and it was found that their volume average particle diameter was 37.9 μm. The result is shown in Table 1. Moreover, using the thus obtained microcapsules (3) for electrophoretic display devices, a sheet (3) for electrophoretic display devices was obtained in the same manner as described in Example 1.

Using the sheet (3) for electrophoretic display devices, an electrophoretic display device was produced by the above-described method, and the contrast and the amount of leakage current were measured. Moreover, the preservation stability in the respective states of the microcapsules (3) for electrophoretic display devices was also evaluated. Further, the steel dropping test for the electrophoretic display device was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. Further, the capsule strength of the microcapsules (3) for electrophoretic display devices was measured by a micro compression tester, and it was found to be 4.3 MPa. The results are shown in Tables 1 and 2.

Example 4

Microcapsules (4) for electrophoretic display devices were obtained in the same manner as described in Example 1, except that the reaction for forming an inner shell was carried out at 40° C. for 2 hours, followed by aging at 60° C. for 2 hours and further at 80° C. for 2 hours, and the reaction for forming an outer shell was carried out at 40° C. for 2 hours, followed by aging at 60° C. for 2 hours.

The particle diameter of the thus obtained microcapsules (4) for electrophoretic display devices was measured, and it was found that their volume average particle diameter was 35.9 μm. The result is shown in Table 1. Moreover, using the thus obtained microcapsules (4) for electrophoretic display devices, a sheet (4) for electrophoretic display devices was obtained in the same manner as described in Example 1.

Using the sheet (4) for electrophoretic display devices, an electrophoretic display device was produced by the above-described method, and the contrast and the amount of leakage current were measured. Moreover, the preservation stability in the respective states of the microcapsules (4) for electrophoretic display devices was also evaluated. Further, the steel dropping test for the electrophoretic display device was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. Further, the capsule strength of the microcapsules (4) for electrophoretic display devices was measured by a micro compression tester, and it was found to be 5.6 MPa. The results are shown in Tables 1 and 2.

Example 5

Microcapsules (5) for electrophoretic display devices were obtained in the same manner as described in Example 1, except that the aqueous solution (A-1) was added while the suspension containing the dispersion (C-1) for electrophoretic display devices was kept at 60° C., and the reaction for forming an inner shell was carried out at 60° C. for 4 hours, followed by aging at 80° C. for 2 hours, and the reaction for forming an outer shell was carried out at 40° C. for 2 hours, followed by aging at 60° C. for 2 hours.

The particle diameter of the thus obtained microcapsules (5) for electrophoretic display devices was measured, and it was found that their volume average particle diameter was 44.4 μm. The result is shown in Table 1. Moreover, using the thus obtained microcapsules (5) for electrophoretic display devices, a sheet (5) for electrophoretic display devices was obtained in the same manner as described in Example 1.

Using the sheet (5) for electrophoretic display devices, an electrophoretic display device was produced by the above-described method, and the contrast and the amount of leakage current were measured. Moreover, the preservation stability in the respective states of the microcapsules (5) for electrophoretic display devices was also evaluated. Further, the steel dropping test for the electrophoretic display device was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. Further, the capsule strength of the microcapsules (5) for electrophoretic display devices was measured by a micro compression tester, and it was found to be 7.0 MPa. The results are shown in Tables 1 and 2.

Example 6

Microcapsules (6) for electrophoretic display devices were obtained in the same manner as described in Example 1, except that the reaction for forming an inner shell was carried out at 40° C. for 4 hours, followed by aging at 60° C. for 2 hours, and the reaction for forming an outer shell was carried out at 60° C. for 2 hours, followed by aging at 80° C. for 2 hours.

The particle diameter of the thus obtained microcapsules (6) for electrophoretic display devices was measured, and it was found that their volume average particle diameter was 42.7 μm. The result is shown in Table 1. Moreover, using the thus obtained microcapsules (6) for electrophoretic display devices, a sheet (6) for the electrophoretic display device was obtained in the same manner as described in Example 1.

Using the sheet (6) for electrophoretic display devices, an electrophoretic display device was produced by the above-described method, and the contrast and the amount of leakage current were measured. Moreover, the preservation stability in the respective states of the microcapsules (6) for electrophoretic display devices was also evaluated. Further, the steel dropping test for the electrophoretic display device was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. Further, the capsule strength of the microcapsules (6) for electrophoretic display devices was measured by a micro compression tester, and it was found to be 6.5 MPa. The results are shown in Tables 1 and 2.

Comparative Example 1

A 500-mL flat-bottom separable flask was charged with 60 g of water, 6 g of gum arabic, and 6 g of gelatin, and the mixture was dissolved. While the solution was kept at 43° C., 100 g of the dispersion (C-1) for electrophoretic display devices heated at 50° C. was added under stirring at 350 rpm using a disper (trade name: ROBOMICS, available from PRIMIX Corporation). After that, the stirring speed was changed to 1,600 rpm, and stirring was carried out for 2 minutes. Then, the stirring speed was changed to 1,000 rpm, and 300 mL of warm water at 43° C. was added to obtain a suspension.

The stirring was changed to stirring by paddle blades, a thermometer and a pH meter were set, and the temperature was kept at 40° C. while the entire content was stirred.

Then, a 10% aqueous acetic acid solution was gradually added dropwise to adjust pH to 4.3. After the gelatin/gum arabic precipitation and microcapsule formation were confirmed by an optical microscope, the mixture was cooled to 10° C.

After the mixture was kept for 30 minutes in the cooled state, 3 mL of a 37% aqueous formalin solution was added and a 10% aqueous sodium carbonate solution was gradually added dropwise to adjust pH to 8.8. After that, the mixture was heated to 30° C. and kept for 2 hours. After aging was carried out at 40° C. for 1 hour, the mixture was cooled to 25° C. and filtered with a standard sieve having meshes of 53 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The particle diameter of the thus obtained microcapsules (C1) for electrophoretic display devices for comparison was measured, and it was found that their volume average particle diameter was 42.1 μm. The result is shown in Table 1. Moreover, using the thus obtained microcapsules (C1) for electrophoretic display devices for comparison, a sheet (C1) for electrophoretic display devices for comparison was obtained in the same manner as described in Example 1.

Using the sheet (C1) for electrophoretic display devices for comparison, an electrophoretic display device was produced by the above-described method, and the contrast and the amount of leakage current were measured. Moreover, the preservation stability in the respective states of the microcapsules (C1) for electrophoretic display devices for comparison was also evaluated. Further, the steel dropping test for the electrophoretic display device was carried out by dropping a steel ball from a height of 6.5 cm, it was confirmed by visual observation and an optical microscope that the microcapsules in a part where the steel ball was dropped were crushed. Further, the capsule strength of the microcapsules (C1) for electrophoretic display devices for comparison was measured by a micro compression tester, and it was found to be 0.55 MPa. The results are shown in Tables 1 and 2.

Comparative Example 2

A 500-mL flat-bottom separable flask was charged with 40 g of the aqueous solution (CA-1) and 60 g of water, and 100 g of the dispersion (C-1) for electrophoretic display devices was added under stirring at 350 rpm using a disper (trade name: ROBOMICS, available from PRIMIX Corporation), followed by stirring at 1,000 rpm for 3 minutes. The stirring speed was changed to 800 rpm, and 50 g of water was added to obtain a suspension.

The suspension was put in a 500-mL four-necked separable flask equipped with a thermometer and a condenser tube, and while being stirred by paddle blades, 32 g of the aqueous solution (A-1) was added, and the mixture was reacted at 35° C. for 2 hours and at 70° C. for 2 hours to obtain a dispersion of microcapsules each enclosing the dispersion (C-1) for electrophoretic display devices in a shell made of an ethylene oxide chain-containing amino resin.

The dispersion thus obtained was cooled to 25° C. and filtered with a standard sieve having meshes of 75 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The particle diameter of the thus obtained microcapsules (C2) for electrophoretic display devices for comparison was measured, and it was found that their volume average particle diameter was 40.1 μm. The result is shown in Table 1. Moreover, using the thus obtained microcapsules (C2) for electrophoretic display devices for comparison, a sheet (C2) for electrophoretic display devices for comparison was obtained in the same manner as described in Example 1.

Using the sheet (C2) for electrophoretic display devices for comparison, an electrophoretic display device was produced by the above-described method, and the contrast and the amount of leakage current were measured. Moreover, the preservation stability in the respective states of the microcapsules (C2) for electrophoretic display device for comparison was also evaluated. Further, the steel dropping test for the electrophoretic display device was carried out by dropping a steel ball from a height of 6.5 cm, it was confirmed by visual observation and an optical microscope that the microcapsules in a part where the steel ball was dropped were crushed. Further, the capsule strength of the microcapsules (C2) for electrophoretic display devices for comparison was measured by a micro compression tester, and it was found to be 0.40 MPa. The results are shown in Tables 1 and 2.

Comparative Example 3

A 500-mL flat-bottom separable flask was charged with 40 g of the aqueous solution (CA-1) and 60 g of water, and 100 g of the dispersion (C-1) for electrophoretic display devices was added under stirring at 350 rpm using a disper (trade name: ROBOMICS, available from PRIMIX Corporation), followed by stirring at 1,000 rpm for 3 minutes. The stirring speed was changed to 800 rpm, and 50 g of water was added to obtain a suspension.

The suspension was put in a 500-mL four-necked separable flask equipped with a thermometer and a condenser tube, and while being stirred by paddle blades, 32 g of the aqueous solution (A-1) was added, and the mixture was heated to 35° C. and kept at the same temperature for 2 hours to obtain a dispersion of microcapsules each enclosing the dispersion (C-1) for electrophoretic display devices in a very thin inner shell made of an ethylene oxide chain-containing amino resin.

Further, while the temperature was kept at 35° C., an aqueous solution obtained by dissolving 10 g of polyglycerol polyglycidyl ether (trade name; Denacol EX-521 (having a mass average molecular weight of 732 and a solubility in water of 100%), available from Nagase Chemtex Corporation) in 50 g of water was added dropwise for 10 minutes. Then, an aqueous solution obtained by dissolving 2 g of sodium diethyldithiocarbamic trihydrate in 100 g of water was added dropwise for 10 minutes. The mixture was reacted at the same temperature for 2 hours and at 70° C. for 2 hours to obtain a dispersion of microcapsules each enclosing the dispersion (C-1) for electrophoretic display devices in a shell having an inner shell made of an ethylene oxide chain-containing melamine resin and an outer shell made of an epoxy resin and formed on the outer surface of the inner shell.

The dispersion thus obtained was cooled to 25° C. and filtered with a standard sieve having meshes of 53 µm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The particle diameter of the thus obtained microcapsules (C3) for electrophoretic display devices for comparison was measured, and it was found that their volume average particle diameter was 39.1 µm. The result is shown in Table 1. Moreover, using the thus obtained microcapsules (C3) for electrophoretic display devices for comparison, a sheet (C3) for electrophoretic display devices for comparison was obtained in the same manner as described in Example 1.

Using the sheet (C3) for electrophoretic display devices for comparison, an electrophoretic display device was produced by the above-described method, and the contrast and the amount of leakage current were measured. Moreover, the preservation stability in the respective states of the microcapsules (C3) for electrophoretic display devices for comparison was also evaluated. Further, the steel dropping test for the electrophoretic display device was carried out by dropping a steel ball from a height of 6.5 cm, it was confirmed by visual observation and an optical microscope that the microcapsules in a part where the steel ball was dropped were crushed. Further, the capsule strength of the microcapsules (C3) for electrophoretic display devices for comparison was measured by a micro compression tester, and it was found to be 0.34 MPa. The results are shown in Tables 1 and 2.

Comparative Example 4

A dispersion of microcapsules each enclosing the dispersion (C-1) for electrophoretic display devices in a shell having an inner shell made of an amino resin containing no mercapto group and an outer shell made of an epoxy resin and formed on the outer surface of the inner shell was obtained in the same manner as described in Example 1, except that 100 g of the aqueous solution containing 2 g of L-cysteine dissolved therein was not added. In this Comparative Example, many transparent particles having a particle diameter of several micrometers to about 10 µm were observed, and these transparent particles were supposed to be particles made of the epoxy resin forming the outer shell. Such transparent particles were not observed in Examples 1 to 6.

The dispersion thus obtained was cooled to 25° C. and filtered with a standard sieve having meshes of 53 µm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The particle diameter of the thus obtained microcapsules (C4) for electrophoretic display devices for comparison was measured, and it was found that their volume average particle diameter was 35.6 µm. The result is shown in Table 1. Moreover, using the thus obtained microcapsules (C4) for electrophoretic display devices for comparison, a sheet (C4) for electrophoretic display devices for comparison was obtained.

Using the sheet (C4) for electrophoretic display devices for comparison, an electrophoretic display device was produced by the above-described method. However, since the microcapsules were broken by the lamination pressure in the production of an electrophoretic display device, it was impossible to measure or evaluate the preservation stability in the respective states of the microcapsules, the contrast and the amount of leakage current of the electrophoretic display device, and the steel dropping test. Moreover, it was tried to measure the capsule strength of the microcapsules; however, the capsule strength was too low to carry out its measurement.

Comparative Example 5

Microcapsules were taken out before the epoxy compound was added in Example 1 to obtain microcapsules (C5) for electrophoretic display devices for comparison. The particle diameter of the thus obtained microcapsules (C5) for electrophoretic display devices for comparison was measured, and it was found that their volume average particle diameter was 39.8 µm. The result is shown in Table 1. Moreover, using the thus obtained microcapsules (C5) for electrophoretic display devices for comparison, a sheet (C4) for electrophoretic display devices for comparison was obtained in the same manner as described in Example 1.

Using the sheet (C5) for electrophoretic display devices for comparison, an electrophoretic display device was produced by the above-described method, and the contrast and the amount of leakage current were measured. Moreover, the preservation stability in the respective state of the microcapsules (C5) for electrophoretic display devices for comparison was also evaluated. However, some of the microcapsules was found to be cracked (confirmed by an optical microscope) by the lamination pressure in the production of an electrophoretic display device, and the content partially leaked, thereby making it impossible to obtain high contrast. Further, when the steel ball dropping test of the electrophoretic display device was carried out by dropping a steel ball from a height of 6.5 cm, it was confirmed by visual observation and an optical microscope that the microcapsules in the part where the steel ball was dropped were crushed. The results are shown in Tables 1 and 2. Further, it was tried to measure the capsule strength of the microcapsules by a micro compression tester; however, the capsule strength was too low to carry out its measurement.

measured by a micro compression tester, the microcapsules had high capsule strength. In particular, the microcapsules of Examples 4 to 6 were obtained by appropriately adjusting the temperature and time in the formation of an inner shell and an outer shell (i.e., the reaction temperature and time for carrying out the condensation reaction of an initial condensation product forming an inner shell, and the temperature and aging period for carrying out aging after that; as well as the temperature and time for forming an inner shell, and the temperature and aging period for carrying out aging after that), and therefore, the microcapsules had higher capsule strength.

TABLE 1

| | Micro-capsules | Shell of microcapsules* | | Particle diameter of microcapsules (μm) | Contrast | Amount of leakage current (μA) | | Steel ball dropping test | Capsule strength (MPa) |
|---|---|---|---|---|---|---|---|---|---|
| | | Inner shell | Outer shell | | | Before humidity resistance test | After humidity resistance test | | |
| Example 1 | 1 | mercapto group-containing amino resin | epoxy resin | 40.7 | 7.8 | 1.0 | 8.0 | 30 cm or higher | 4.6 |
| Example 2 | 2 | mercapto group-containing amino resin | epoxy resin | 26.6 | 8.0 | 0.8 | 15.0 | 30 cm or higher | 4.0 |
| Example 3 | 3 | mercapto group-containing amino resin | melamine-crosslinked epoxy resin | 37.9 | 8.3 | 0.7 | 6.0 | 30 cm or higher | 4.3 |
| Example 4 | 4 | mercapto group-containing amino resin | epoxy resin | 35.9 | 7.3 | 1.1 | 12.0 | 30 cm or higher | 5.6 |
| Example 5 | 5 | mercapto group-containing amino resin | epoxy resin | 44.4 | 7.5 | 1.0 | 10.0 | 30 cm or higher | 7.0 |
| Example 6 | 6 | mercapto group-containing amino resin | epoxy resin | 42.7 | 7.7 | 1.1 | 14.0 | 30 cm or higher | 6.5 |
| Comp. Ex. 1 | C1 | gelatin/gum arabic | | 42.1 | 6.4 | 1.7 | 1,800 | lower than 6.5 cm | 0.55 |
| Comp. Ex. 2 | C2 | ethylene oxide chain-containing amino resin | | 40.1 | 6.9 | 5.0 | 210 | lower than 6.5 cm | 0.40 |
| Comp. Ex. 3 | C3 | ethylene oxide chain-containing amino resin | epoxy resin | 39.1 | 7.2 | 2.2 | 150 | lower than 6.5 cm | 0.34 |
| Comp. Ex. 4 | C4 | amino resin containing no mercapto group | epoxy resin | 35.6 | — | — | — | measurement impossible | measurement impossible |
| Comp. Ex. 5 | C5 | mercapto group-containing amino resin | | 39.8 | 5.1 | 0.5 | 3.5 | Lower than 6.5 cm | measurement impossible |

*Each of the microcapsules with no distinction between the inner shell and the outer shell has a monolayer shell.

As can be seen from Table 1, since the microcapsules of Examples 1 to 6 have a shell having an inner shell made of a mercapto group-containing amino resin and an outer shell made of an epoxy resin, high contrast was obtained when the microcapsules were used for electrophoretic display devices, and at the same time, even after the microcapsules were kept under high temperature and high humidity conditions for a long period of time (specifically, at 60° C. and 90% RH for 24 hours), the electrophoretic display devices showed low leakage current values. In particular, since the outer shell in the microcapsules of Example 3 was made of a melamine-crosslinked epoxy resin, the microcapsules of Example 3 had higher performance than that of the microcapsules of Examples 1, 2, and 4 to 6. Moreover, when the microcapsules of Examples 1 to 6 were used for electrophoretic display devices, the microcapsules were not crushed, even if the steel ball was dropped from a height of 30 cm in the steel ball dropping test, and actually, when the capsule strength was In contrast, since the microcapsules of Comparative Examples 1 to 3 had shells made of conventional materials, the microcapsules showed low contrast, as compared with the microcapsules of Examples 1 to 6, and at the same time, after the microcapsules were left under high temperature and high humidity conditions for a long period of time (specifically, at 60° C. and 90% RH for 24 hours), the microcapsules showed high leakage current values, as compared with the microcapsules of Examples 1 to 6. In particular, since the microcapsules of Comparative Example 1 had a shell made of gelatin/gum arabic, after the microcapsules were left under high temperature and high humidity conditions for a long period of time (specifically, at 60° C. and 90% RH for 24 hours), the microcapsules showed an extremely high leakage current value. Moreover, since the microcapsules of Comparative Example 4 had a thin inner shell made of an amino resin having no mercapto group and a thin outer shell made of an epoxy resin and had no bond between the inner shell and the outer shell, the microcapsules had very low capsule strength, and the microcapsules were broken by the lamination pressure in the production of an electrophoretic display device, and therefore, it became impossible to measure the contrast and the amount of leakage current. Further, since the microcapsules of Comparative Example 5 had a thick shell made of a mercapto group-containing amino resin, the microcapsules showed high capsule strength and a low leakage current value even after the microcapsules were left under high temperature and high humidity conditions for a long period of time (specifically, at 60° C. and 90% RH for 24 hours). However, some of the microcapsules were cracked by the lamination pressure in the production of an electrophoretic display device, thereby making it impossible to show high contrast. Further, when the microcapsules of Comparative Examples 1 to 3 and 5 were used for electrophoretic display devices, the microcapsules were crushed by dropping a steel ball from only a height of 6.5 cm in the steel ball dropping test, and actually, when the capsule strength was measured by a micro compression tester, the microcapsules were found to have low capsule strength. Further, the microcapsules of Comparative Examples 4 and 5 had too low capsule strength to carry out its measurement.

TABLE 2

| | Microcapsules | Initial stage (A) | (B) | After a lapse of 10 days (A) | (B) | After a lapse of 20 days (A) | (B) | After a lapse of 30 days (A) | (B) |
|---|---|---|---|---|---|---|---|---|---|
| Example 1 | 1 | 7.6 | 7.8 | 7.8 | 7.9 | 7.5 | 7.8 | 7.3 | 7.9 |
| Example 2 | 2 | 8.0 | 8.2 | 7.8 | 8.1 | 7.5 | 7.8 | 7.2 | 8.0 |
| Example 3 | 3 | 8.3 | 8.3 | 7.8 | 8.0 | 7.7 | 8.2 | 7.5 | 8.1 |
| Example 4 | 4 | 7.7 | 7.7 | 7.8 | 7.8 | 7.6 | 7.8 | 7.9 | 7.6 |
| Example 5 | 5 | 8.2 | 7.6 | 8.1 | 7.9 | 7.9 | 7.5 | 7.7 | 7.5 |
| Example 6 | 6 | 8.3 | 7.8 | 8.2 | 7.8 | 8.0 | 7.9 | 8.1 | 7.7 |
| Comp. Ex. 1 | C1 | 6.3 | 6.4 | 1.0 | 5.4 | — | 3.1 | — | 1.3 |
| Comp. Ex. 2 | C2 | 6.9 | 6.9 | 4.8 | 6.5 | 3.1 | 5.1 | 2.2 | 3.6 |
| Comp. Ex. 3 | C3 | 7.1 | 7.2 | 5.9 | 7.1 | 5.4 | 6.7 | 3.3 | 5.1 |
| Comp. Ex. 4 | C4 | — | — | — | — | — | — | — | — |
| Comp. Ex. 5 | C5 | 5.0 | 5.1 | 4.7 | 4.8 | 4.6 | 4.6 | 4.3 | 4.5 |

As can be seen from Table 2, the microcapsules of Examples 1 to 6 were able to be stably preserved at room temperature for 30 days and showed high preservation stability, in the form of (A) a coating solution, which was a mixture of the microcapsules and a binder resin, and in the form of (B) a sheet for electrophoretic display devices, which was obtained by applying the coating solution to a PET film with ITO.

In contrast, the microcapsules of Comparative Examples 1 to 3 and 5 showed low preservation stability, as compared with the microcapsules of Examples 1 to 6. In particular, the microcapsules of Comparative Example 1 were broken by the lamination pressure in the production of an electrophoretic display device after a lapse of 20 days when preserved in the form of a coating solution, which was a mixture of the microcapsules and a binder resin, and therefore, the evaluation after that was impossible. Moreover, the microcapsules of Comparative Example 4 were broken by the lamination pressure in the production of an electrophoretic display device, as described above, and therefore, the evaluation of the preservation stability was impossible.

Accordingly, if shells each having an inner shell made of a mercapto group-containing amino resin and an outer shell made of an epoxy resin are used, it is made possible to obtain microcapsules for electrophoretic display devices which have high capsule strength, and at the same time, can be used to produce an electrophoretic display device showing high contrast and a low leakage current value, even after the electrophoretic display device is left under high temperature and high humidity conditions for a long period of time, and can be preserved at room temperature over a long period of time in specific forms.

Example 7

A 500-mL flat-bottom separable flask was charged with 120 g of an aqueous solution containing 12 g of soybean polysaccharide (trade name: SOYAFIBE-S-LNP, available from Fuji Oil Co., Ltd.) dissolved therein, and 100 g of the dispersion (C-1) for electrophoretic display devices was added under stirring at 600 rpm using a disper (trade name: ROBOMICS, available from PRIMIX Corporation). After that, the stirring speed was changed to 1,600 rpm, followed by stirring for 2 minutes, and the stirring speed was changed to 1,000 rpm, and 100 g of water was added to obtain a suspension.

The suspension was put in a 300-mL four-necked separable flask equipped with a thermometer and a condenser tube, and while being kept at 40° C. and stirred by paddle blades, 48 g of the aqueous solution (A-1) was added. After 15 minutes, 100 g of an aqueous solution containing 2 g of L-cysteine dissolved therein was added dropwise by a dropping funnel over 5 minutes. While being kept at 40° C., the reaction was carried out for 4 hours, and the temperature was then increased to 50° C., and aging was carried out for 2 hours to obtain a dispersion of microcapsules each enclosing the dispersion (C-1) for electrophoretic display devices in an inner shell made of a mercapto group-containing amino resin.

The dispersion thus obtained was cooled to 25° C. and filtered with a standard sieve having meshes of 75 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

Then, water was added to the microcapsules to obtain 200 g of a dispersion, and the dispersion was transferred to the above flat-bottom separable flask and heated to 40° C. under stirring.

To the microcapsule dispersion was added 100 g of an aqueous solution containing 15 g of polyglycerol polyglycidyl ether (trade name: Denacol EX-521 (having a mass average molecular weight of 732 and a solubility in water of 100%), available from Nagase Chemtex Corporation), as an epoxy compound, dissolved therein. After 30 minutes, 50 g of an aqueous solution containing 2 g of sodium diethyldithiocarbamate dissolved therein was added dropwise by a dropping funnel over 5 minutes. While being kept at 40° C., the reaction was carried out for 3 hours, and the temperature was then increased to 50° C., and aging was carried out for 1 hour to obtain a dispersion of microcapsules each enclosing the dispersion (C-1) for electrophoretic display devices in a shell having an inner shell made of a mercapto group-containing amino resin and an outer shell made of an epoxy resin and formed on the outer surface of the inner shell.

The dispersion thus obtained was cooled to 25° C. and filtered with a standard sieve having meshes of 53 μm to remove coarse capsules. Then, the microcapsule dispersion was put in a 2-L beaker, and water was added to adjust the entire amount to be 1,000 mL. The dispersion was kept still as it was to precipitate the microcapsules, and the supernatant solution was discarded. This operation was repeated three times to wash the microcapsules.

The particle diameter of the thus obtained microcapsules (7) for electrophoretic display devices was measured, and it was found that their volume average particle diameter was 39.8 µm. The result is shown in Table 3.

The microcapsules (7) for electrophoretic display devices were suction-filtered to obtain a microcapsule paste (7) for electrophoretic display devices with a solid content of 65%.

A coating solution was obtained by adding 6 g of a resin solution with a solid content of 50%, in which an alkali-soluble acrylic resin (trade name: WR 301A, available from Nippon Shokubai Co., Ltd.) was dissolved in ammonia, to 30 g of the paste obtained above, and mixing the mixture by a hybrid defoaming mixer (trade name: Awatori Rentaro (registered trade name) AR-100, available from THINKY Corporation) for 10 minutes.

The coating solution was applied to a PET film with ITO by an applicator and dried at 90° C. for 10 minutes to obtain a sheet (7) for electrophoretic display devices.

Using the sheet (7) for electrophoretic display devices, an electrophoretic display device was produced by the above-described method, and when the steel dropping test was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. The result is shown in Table 3.

The capsule strength of the microcapsules (7) for electrophoretic display devices was measured by a micro compression tester, and it was found to be 7.1 MPa. Moreover, the solvent resistance of the microcapsules (7) for electrophoretic display devices was tested, and it was found that the entire microcapsules did not show any change at all. The result is shown in Table 3.

With respect to the electrophoretic display device produced as described above, the contrast and the amount of leakage current were measured. Moreover, the preservation stability in the respective states of the microcapsules (7) for electrophoretic display devices was also evaluated. The results are shown in Tables 3 and 4.

Example 8

Microcapsules (8) for electrophoretic display devices were obtained in the same manner as described in Example 7, except that the soybean polysaccharide was changed to soybean polysaccharide (trade name: SOYAFIBE-S-DN, available from Fuji Oil Co., Ltd.), a suspension was obtained by changing the stirring speed, by a disper, of 1,600 rpm to 1,800 rpm and the aqueous solution (A-2) was used in place of the aqueous solution (A-1) for forming an inner shell.

The particle diameter of the thus obtained microcapsules (8) for electrophoretic display devices was measured, and it was found that their volume average particle diameter was 40.5 µm. The result is shown in Table 3. Moreover, using the thus obtained microcapsules (8) for electrophoretic display devices, a sheet (8) for electrophoretic display devices was obtained in the same manner as described in Example 7.

Using the sheet (8) for electrophoretic display devices, an electrophoretic display device was produced by the above-described method, and when the steel dropping test was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. The result is shown in Table 3.

The capsule strength of the microcapsules (8) for electrophoretic display devices was measured by a micro compression tester, and it was found to be 6.5 MPa. Moreover, the solvent resistance of the microcapsules (8) for electrophoretic display devices was tested, and it was found that the entire microcapsules did not show any change at all. The result is shown in Table 3.

With respect to the electrophoretic display device produced as described above, the contrast and the amount of leakage current were measured. Moreover, the preservation stability in the respective states of the microcapsules (8) for electrophoretic display devices was also evaluated. The results are shown in Tables 3 and 4.

Example 9

Microcapsules (9) for electrophoretic display devices were obtained in the same manner as described in Example 7, except that the soybean polysaccharide was changed to soybean polysaccharide (trade name: SOYAFIBE-S-HR 100, available from Fuji Oil Co., Ltd.), the aqueous solution (A-3) was used in place of the aqueous solution (A-1) for forming an inner shell, and 49 g of the aqueous solution (B-2) was added after 15 minutes from the addition of the epoxy compound, and further after 30 minutes, 50 g of an aqueous solution containing 1 g of sodium diethyldithiocarbamate dissolved therein was added dropwise using a dropping funnel over 5 minutes.

The particle diameter of the thus obtained microcapsules (9) for electrophoretic display devices was measured, and it was found that their volume average particle diameter was 38.2 µm. The result is shown in Table 3. Moreover, using the thus obtained microcapsules (9) for electrophoretic display devices, a sheet (9) for electrophoretic display devices was obtained in the same manner as described in Example 7.

Using the sheet (9) for electrophoretic display devices, an electrophoretic display device was produced by the above-described method, and when the steel dropping test was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. The result is shown in Table 3.

The capsule strength of the microcapsules (9) for electrophoretic display devices was measured by a micro compression tester, and it was found to be 6.0 MPa. Moreover, the solvent resistance of the microcapsules (9) for electrophoretic display devices was tested, and it was found that there were some microcapsules each having a slight dent; however, almost all of the microcapsules did not show any change. The result is shown in Table 3.

With respect to the electrophoretic display device produced as described above, the contrast and the amount of leakage current were measured. Moreover, the preservation stability in the respective states of the microcapsules (9) for electrophoretic display devices was also evaluated. The results are shown in Tables 3 and 4.

Example 10

Microcapsules (10) for electrophoretic display devices were obtained in the same manner as described in Example 7, except that the soybean polysaccharide was changed to soybean polysaccharide (trade name: SOYAFIBE-S-ZR 100, available from Fuji Oil Co., Ltd.).

The particle diameter of the thus obtained microcapsules (10) for electrophoretic display devices was measured, and it was found that their volume average particle diameter was 35.9 µm. The result is shown in Table 3. Moreover, using the thus obtained microcapsules (10) for electrophoretic display devices, a sheet (10) for electrophoretic display devices was obtained in the same manner as described in Example 7.

Using the sheet (10) for electrophoretic display devices, an electrophoretic display device was produced by the above-described method, and when the steel dropping test was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. The result is shown in Table 3.

The capsule strength of the microcapsules (10) for electrophoretic display devices was measured by a micro compression tester, and it was found to be 6.7 MPa. Moreover, the solvent resistance of the microcapsules (10) for electrophoretic display devices was tested, and it was found that there were some microcapsules each having a slight dent; however, almost all of the microcapsules did not show any change. The result is shown in Table 3.

With respect to the electrophoretic display device produced as described above, the contrast and the amount of leakage current were measured. Moreover, the preservation stability in the respective states of the microcapsules (10) for electrophoretic display devices was also evaluated. The results are shown in Tables 3 and 4.

Example 11

Microcapsules (11) for electrophoretic display device were obtained in the same manner as described in Example 7, except that the soybean polysaccharide was changed to soybean polysaccharide (trade name: SOYAFIBE-S-LN, available from Fuji Oil Co., Ltd.), a suspension was obtained by changing the stirring speed, by a disper, of 1,600 rpm to 1,800 rpm, and the aqueous solution (A-2) was used in place of the aqueous solution (A-1) for forming an inner shell.

The particle diameter of the thus obtained microcapsules (11) for electrophoretic display devices was measured, and it was found that their volume average particle diameter was 44.4 µm. The result is shown in Table 3. Moreover, using the thus obtained microcapsules (11) for electrophoretic display devices, a sheet (11) for electrophoretic display devices was obtained in the same manner as described in Example 7.

Using the sheet (11) for electrophoretic display devices, an electrophoretic display device was produced by the above-described method, and when the steel dropping test was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. The result is shown in Table 3.

The capsule strength of the microcapsules (11) for electrophoretic display devices was measured by a micro compression tester, and it was found to be 7.5 MPa. Moreover, the solvent resistance of the microcapsules (11) for electrophoretic display devices was tested, and it was found that the entire microcapsules did not show any change at all. The result is shown in Table 3.

With respect to the electrophoretic display device produced as described above, the contrast and the amount of leakage current were measured. Moreover, the preservation stability in the respective states of the microcapsules (11) for electrophoretic display devices was also evaluated. The results are shown in Tables 3 and 4.

Example 12

Microcapsules (12) for electrophoretic display devices were obtained in the same manner as described in Example 7, except that the soybean polysaccharide was changed to soybean polysaccharide (trade name: SOYAFIBE-S-EN 100, available from Fuji Oil Co., Ltd.), the aqueous solution (A-3) was used in place of the aqueous solution (A-1) for forming an inner shell, and 49 g of the aqueous solution (B-2) was added after 15 minutes from the addition of the epoxy compound, and further after 30 minutes, 50 g of an aqueous solution containing 1 g of sodium diethyldithiocarbamate dissolved therein was added dropwise using a dropping funnel over 5 minutes.

The particle diameter of the thus obtained microcapsules (12) for electrophoretic display devices was measured, and it was found that their volume average particle diameter was 42.7 µm. The result is shown in Table 3. Moreover, using the thus obtained microcapsules (12) for electrophoretic display devices, a sheet (12) for electrophoretic display devices was obtained in the same manner as described in Example 7.

Using the sheet (12) for electrophoretic display devices, an electrophoretic display device was produced by the above-described method, and when the steel dropping test was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. The result is shown in Table 3.

The capsule strength of the microcapsules (12) for electrophoretic display devices was measured by a micro compression tester, and it was found to be 5.8 MPa. Moreover, the solvent resistance of the microcapsules (12) for electrophoretic display devices was tested, and it was found that there were some microcapsules each having a slight dent; however, almost all of the microcapsules did not show any change. The result is shown in Table 3.

With respect to the electrophoretic display device produced as described above, the contrast and the amount of leakage current were measured. Moreover, the preservation stability in the respective states of the microcapsules (12) for electrophoretic display devices was also evaluated. The results are shown in Tables 3 and 4.

Example 13

Microcapsules (13) for electrophoretic display devices were obtained in the same manner as described in Example 7, except that the soybean polysaccharide was changed to soybean polysaccharide (trade name: SM-700, available from San-Ei Gen F.F.I., Inc.).

The particle diameter of the thus obtained microcapsules (13) for electrophoretic display devices was measured, and it was found that their volume average particle diameter was 50.1 μm. The result is shown in Table 3. Moreover, using the thus obtained microcapsules (13) for electrophoretic display devices, a sheet (13) for electrophoretic display devices was obtained in the same manner as described in Example 7.

Using the sheet (13) for electrophoretic display devices, an electrophoretic display device was produced by the above-described method, and when the steel dropping test was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. The result is shown in Table 3.

Further, the capsule strength of the microcapsules (13) for electrophoretic display devices was measured by a micro compression tester, and it was found to be 6.2 MPa. Moreover, the solvent resistance of the microcapsules (13) for electrophoretic display devices was tested, and it was found that there were some microcapsules each having a slight dent; however, almost all of the microcapsules did not show any change. The result is shown in Table 3.

With respect to the electrophoretic display device produced as described above, the contrast and the amount of leakage current were measured. Moreover, the preservation stability in the respective states of the microcapsules (13) for electrophoretic display devices was also evaluated. The results are shown in Tables 3 and 4.

Example 14

Microcapsules (14) for electrophoretic display devices were obtained in the same manner as described in Example 7, except that the soybean polysaccharide was changed to soybean polysaccharide (trade name: SM-1200, available from San-Ei Gen F.F.I., Inc.), a suspension liquid was obtained by changing the stirring speed, by a disper, of 1,600 rpm to 1,800 rpm, and the aqueous solution (A-2) was used in place of the aqueous solution (A-1) for forming an inner shell.

The particle diameter of the thus obtained microcapsules (14) for electrophoretic display devices was measured, and it was found that their volume average particle diameter was 41.3 μm. The result is shown in Table 3. Moreover, using the thus obtained microcapsules (14) for electrophoretic display devices, a sheet (14) for electrophoretic display devices was obtained in the same manner as described in Example 7.

Using the sheet (14) for electrophoretic display devices, an electrophoretic display device was produced by the above-described method, and when the steel dropping test was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. The result is shown in Table 3.

The capsule strength of the microcapsules (14) for electrophoretic display devices was measured by a micro compression tester, and it was found to be 5.9 MPa. Moreover, the solvent resistance of the microcapsules (14) for electrophoretic display devices was tested, and it was found that the entire microcapsules did not show any change at all. The result is shown in Table 3.

With respect to the electrophoretic display device produced as described above, the contrast and the amount of leakage current were measured. Moreover, the preservation stability in the respective states of the microcapsules (14) for electrophoretic display devices was also evaluated. The results are shown in Tables 3 and 4.

Example 15

Microcapsules (15) for electrophoretic display devices were obtained in the same manner as described in Example 7, except that the soybean polysaccharide was changed to polysaccharide (trade name: Ghatti Gum SD, available from San-Ei Gen F.F.I., Inc.), the aqueous solution (A-3) was used in place of the aqueous solution (A-1) for forming an inner shell, and 49 g of the aqueous solution (B-2) was added after 15 minutes from the addition of the epoxy compound, and further after 30 minutes, 50 g of an aqueous solution containing 1 g of sodium diethyldithiocarbamate dissolved therein was added dropwise using a dropping funnel over 5 minutes.

The particle diameter of the thus obtained microcapsules (15) for electrophoretic display devices was measured, and it was found that their volume average particle diameter was 42.6 μm. The result is shown in Table 3. Moreover, using the thus obtained microcapsules (15) for electrophoretic display devices, a sheet (15) for electrophoretic display devices was obtained in the same manner as described in Example 7.

Using the sheet (15) for electrophoretic display devices, an electrophoretic display device was produced by the above-described method, and when the steel dropping test was carried out by dropping a steel ball from a height of 30 cm, the part where the steel ball was dropped became clouded. When the part where the steel ball was dropped was observed by an optical microscope, the microcapsules were found not to have been crushed. Subsequently, when a voltage of 20 V was applied to the electrophoretic display device, the cloudiness of the part where the steel ball was dropped disappeared. The result is shown in Table 3.

The capsule strength of the microcapsules (15) for electrophoretic display devices was measured by a micro compression tester, and it was found to be 5.5 MPa. Moreover, the solvent resistance of the microcapsules (15) for electrophoretic display devices was tested, and it was found that the entire microcapsules did not show any change at all. The result is shown in Table 3.

With respect to the electrophoretic display device produced as described above, the contrast and the amount of leakage current were measured. Moreover, the preservation stability in the respective states of the microcapsules (15) for electrophoretic display devices was also evaluated. The results are shown in Tables 3 and 4.

TABLE 3

Amount of
leakage current

|  | Polysaccharide | Micro-capsules | Particle diameter of micro-capsules (μm) | Contrast | Before humidity resistance test (μA) | After humidity resistance test (μA) | Solvent resistance of microcapsules (ethanol resistance) | Steel ball dropping test | Capsule strength (MPa) |
|---|---|---|---|---|---|---|---|---|---|
| Example 7 | SOYAFIBE-S-LNP | 7 | 39.8 | 7.9 | 1.0 | 7.8 | A | 30 cm or higher | 7.1 |
| Example 8 | SOYAFIBE-S-DN | 8 | 40.5 | 8.0 | 0.9 | 12.0 | A | 30 cm or higher | 6.5 |
| Example 9 | SOYAFIBE-S-HR100 | 9 | 38.2 | 8.5 | 1.1 | 8.8 | B | 30 cm or higher | 6.0 |
| Example 10 | SOYAFIBE-S-ZR100 | 10 | 35.9 | 7.3 | 0.8 | 13.3 | B | 30 cm or higher | 6.7 |
| Example 11 | SOYAFIBE-S-LN | 11 | 44.4 | 7.5 | 1.0 | 9.8 | A | 30 cm or higher | 7.5 |
| Example 12 | SOYAFIBE-S-EN100 | 12 | 42.7 | 7.7 | 0.9 | 15.0 | B | 30 cm or higher | 5.8 |
| Example 13 | SM-700 | 13 | 50.1 | 8.2 | 0.8 | 8.0 | B | 30 cm or higher | 6.2 |
| Example 14 | SM-1200 | 14 | 41.3 | 7.6 | 1.3 | 8.9 | A | 30 cm or higher | 5.9 |
| Example 15 | Ghatti gum SD | 15 | 42.6 | 7.9 | 1.0 | 12.4 | A | 30 cm or higher | 5.5 |

As can be seen from Table 3, the microcapsules of Examples 7 to 15 were produced in the same manner as the microcapsules of Examples 1 to 3, except that specific polysaccharides such as soybean polysaccharides and ghatti gum were used in place of gum Arabic, and when the microcapsules were used for electrophoretic display devices, even if a steel ball was dropped from a height of 30 cm in the steel ball dropping test, the microcapsules were not crushed, and actually, when the capsule strength was measured by a micro compression tester, the microcapsules had higher capsule strength, as compared with the microcapsules of Examples 1 to 3, and also showed higher resistance to ethanol in the solvent resistance test, as compared with the microcapsules of Examples 1 to 3. The microcapsules of Examples 7 to 15 showed high contrast and a low leakage current value even after the microcapsules were kept under high temperature and high humidity conditions for a long period of time (specifically, at 60° C. and 90% RH for 24 hours) when the microcapsules were used for electrophoretic display devices.

TABLE 4

|  |  | Initial stage |  | After a lapse of 10 days |  | After a lapse of 20 days |  | After a lapse of 30 days |  |
|---|---|---|---|---|---|---|---|---|---|
|  | Microcapsules | (A) | (B) | (A) | (B) | (A) | (B) | (A) | (B) |
| Example 7 | 7 | 7.9 | 7.6 | 7.7 | 7.8 | 7.6 | 7.7 | 7.8 | 7.5 |
| Example 8 | 8 | 8.1 | 7.9 | 8.1 | 7.8 | 7.9 | 7.6 | 7.7 | 7.3 |
| Example 9 | 9 | 8.2 | 8.2 | 8.2 | 7.8 | 8.1 | 7.8 | 8.0 | 7.6 |
| Example 10 | 10 | 8.0 | 7.7 | 7.7 | 7.9 | 7.8 | 7.8 | 7.9 | 7.9 |
| Example 11 | 11 | 8.1 | 8.0 | 8.1 | 7.9 | 7.8 | 7.5 | 7.5 | 7.5 |
| Example 12 | 12 | 7.9 | 8.1 | 8.0 | 8.0 | 8.1 | 7.8 | 8.0 | 7.6 |
| Example 13 | 13 | 7.9 | 7.7 | 7.7 | 7.7 | 8.0 | 8.0 | 8.0 | 8.0 |
| Example 14 | 14 | 7.5 | 7.5 | 7.5 | 7.5 | 7.5 | 7.5 | 7.7 | 7.7 |
| Example 15 | 15 | 7.8 | 7.8 | 8.0 | 7.9 | 7.9 | 7.9 | 7.9 | 7.8 |

As can be seen from Table 4, the microcapsules of Examples 7 to 15 were able to be stably preserved at room temperature for 30 days and showed high preservation stability, in the form of (A) a coating solution, which was a mixture of the microcapsules and a binder resin, and in the form of (B) a sheet for electrophoretic display devices, which were obtained by applying the coating solution to a PET film with ITO.

Accordingly, if microcapsules are produced using specific polysaccharides such as soybean polysaccharides and ghatti gum, it is made possible to obtain microcapsules for electrophoretic display devices which have high capsule strength and solvent resistance, and at the same time, can be used to produce an electrophoretic display device showing high contrast and a low leakage current value, even after the electrophoretic display device is left under high temperature and high humidity conditions for a long period of time, and can be preserved at room temperature over a long period of time in specific forms.

Then, the following will describe specific examples of the electronic equipment of the present invention, which comprises the electrophoretic display device of the present invention as a data displaying means. The electrophoretic display device of the present invention comprises a data displaying part, and the data displaying part is made of the sheet for electrophoretic display devices according to the present invention, which is obtained using the microcapsules for electrophoretic display devices according to the present invention.

Example 16

FIG. 1 is a plan view showing one example of an IC card which is one embodiment of the electronic equipment of the present invention. IC card 10 has two operation buttons 11 and 11, and display panel 12. In the IC card 10, display panel 12 as a data displaying means is the electrophoretic display device of the present invention.

Example 17

Figure 2:
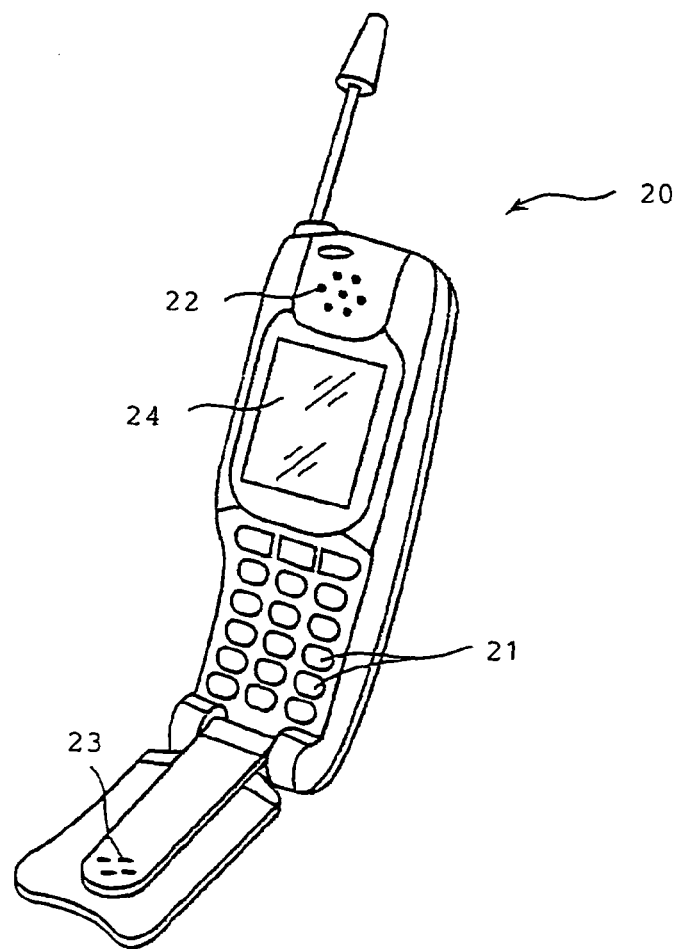
FIG. 2 is a perspective view showing one example of a mobile phone which is another embodiment of the electronic equipment of the present invention.

FIG. 2 is a perspective view showing one example of a mobile phone which is another embodiment of the electronic equipment of the present invention. Mobile phone 20 has two or more buttons 21, 21, . . . , and 21, earpiece 22, mouthpiece 23, and display panel 24. In the mobile phone 20, display panel 24 as a data displaying means is the electrophoretic display device of the present invention.

Example 18

Figure 3:
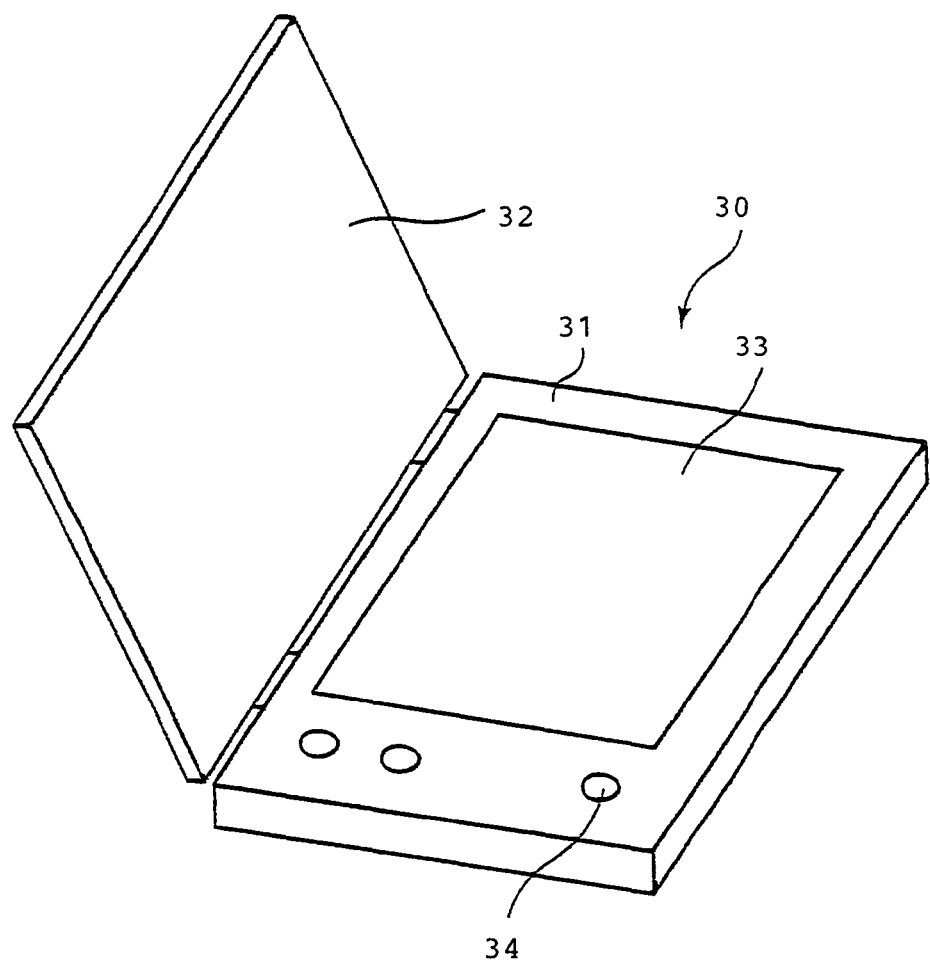
FIG. 3 is a perspective view showing one example of an electronic book which is still another embodiment of the electronic equipment of the present invention.

FIG. 3 is a perspective view showing one example of an electronic book which is still another embodiment of the electronic equipment of the present invention. Electronic book 30 has a book-shaped frame 31, and cover 32 which is provided rotatably relative to the frame 31 (openable and closable). Frame 31 has display device 33 in the state where the display surface is opened, and operating portion 34. In the electronic book 30, display device 33 as a data displaying means is the electrophoretic display device of the present invention.

Example 19

Figure 4:
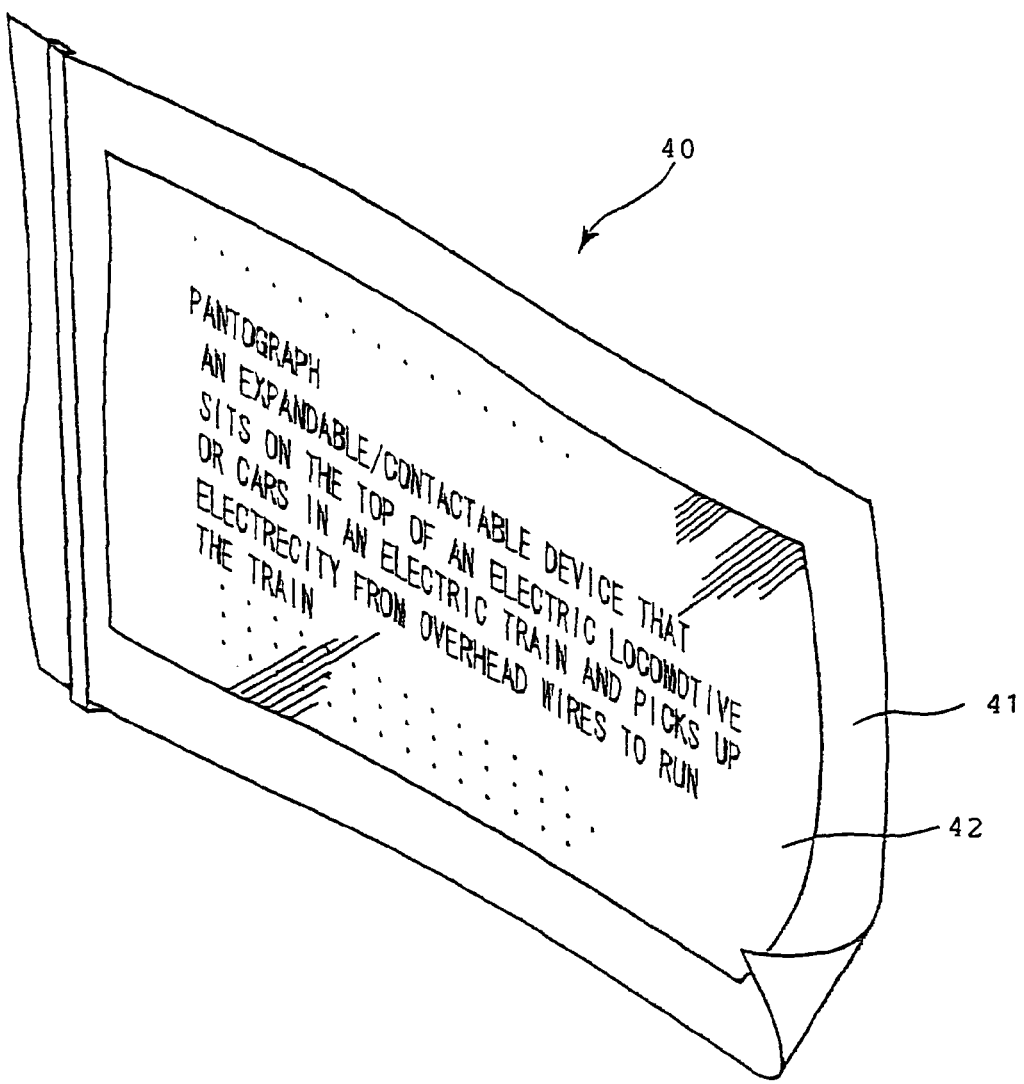
FIG. 4 is a perspective view showing one example of an electronic paper which is still another embodiment of the electronic equipment of the present invention.

FIG. 4 is a perspective view showing one example of an electronic paper which is still another embodiment of the electronic equipment of the present invention. Electronic paper 40 has body 41 formed of a re-writable sheet having the same texture and flexibility as those of a paper, and display unit 42. In the electronic paper 40, display unit 42 as a data displaying means is the electrophoretic display device of the present invention.

Each of the IC card of Example 16, the mobile phone of Example 17, the electronic book of Example 18, and the electronic paper of Example 19 includes the electrophoretic display device of the present invention as the data displaying means, so that they are excellent in the display performance such as contrast and can show a low leakage current value and keep excellent display performance even after they are left under high temperature and high humidity conditions for a long period of time (e.g., 60° C. and 90% RH for hours).

Figure 5:
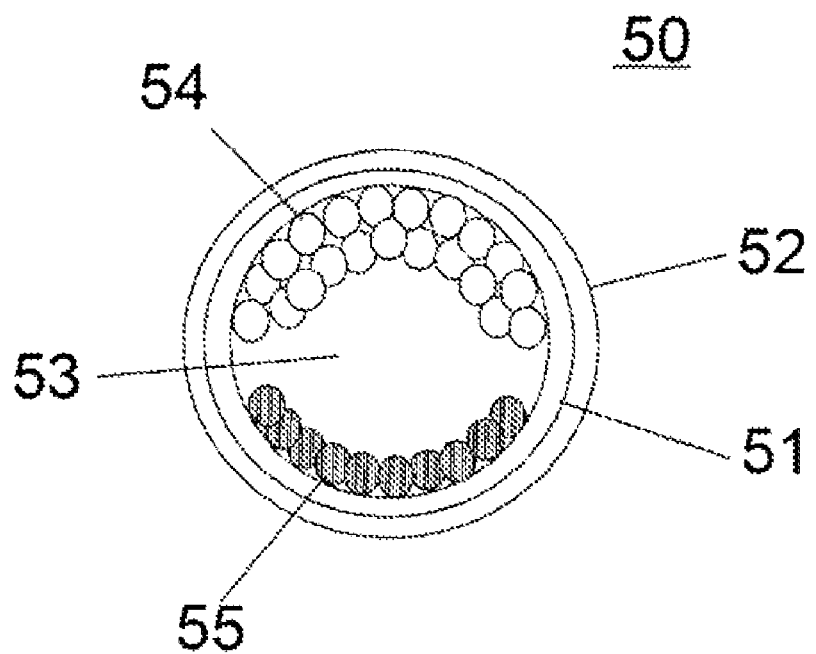
FIG. 5 is a schematic cross-sectional view of a microcapsule for electrophoretic display devices according to the present invention.

FIG. 5 is a schematic cross-sectional view of a microcapsule for electrophoretic display devices according to the present invention. In FIG. 5, the microcapsule 50 consists of an inner shell 51 and an outer shell 52, and encloses a dispersion containing a solvent 53 and electrophoretic particles 54 and 55.

Figure 6:
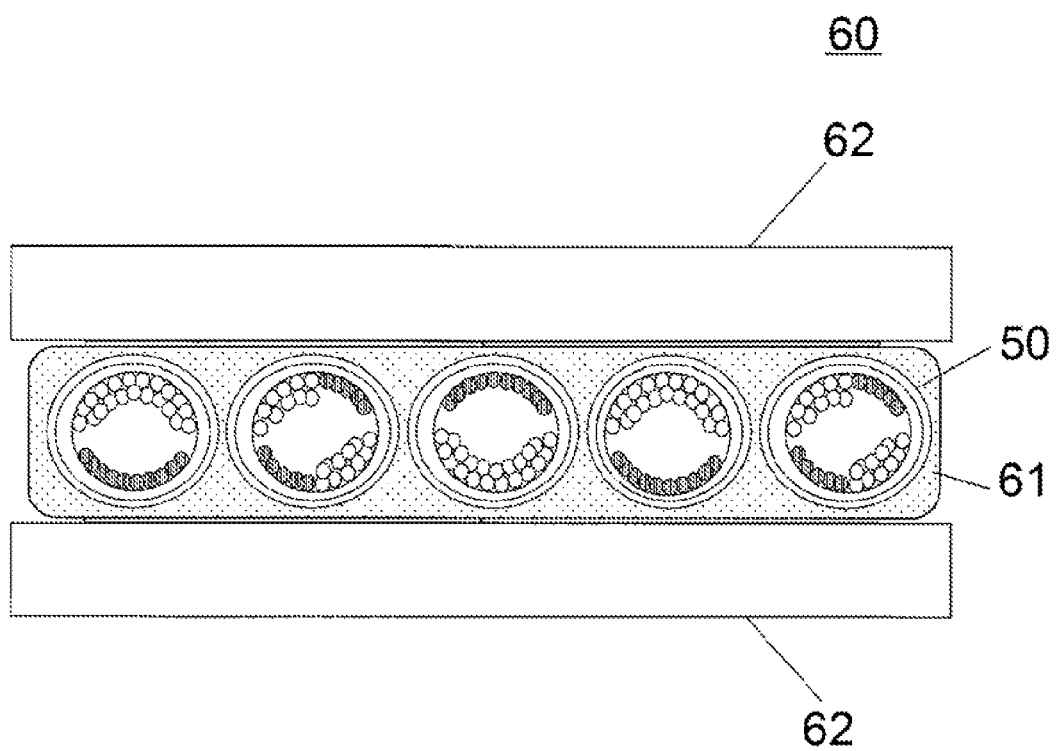
FIG. 6 is a schematic cross-sectional view of a sheet for electrophoretic display devices according to the present invention.

FIG. 6 is a schematic cross-sectional view of a sheet for electrophoretic display devices according to the present invention. In FIG. 6, a sheet 60 comprises a layer containing microcapsules 50 and a binder resin 61, which is formed on an electrically conductive film 62.

INDUSTRIAL APPLICABILITY

The microcapsules for electrophoretic display devices according to the present invention have high capsule strength and solvent resistance, can be used to produce electrophoretic display devices showing high contrast and a low leakage current value even after these electrophoretic display devices are left under high temperature and high humidity conditions for a long period of time, and can be preserved at room temperature over a long period of time in specific forms. The production processes of the present invention makes it possible to simply and efficiently produce the microcapsules for electrophoretic display devices. The sheets for electrophoretic display devices according to the present invention are useful for the production of electrophoretic display devices and electronic equipments, showing high performance as described above. Therefore, the microcapsules for electrophoretic display devices, the processes for their production, and their applications, according to the present invention, make a great contribution, as a series of techniques for providing data displaying means having extremely excellent display quality, to fields relevant to electronic equipments having data displaying means.

The invention claimed is:

1. A microcapsule for electrophoretic display devices, enclosing a dispersion containing electrophoretic particles and a solvent in a shell, wherein the shell consists of an inner shell made only of a mercapto group-containing amino resin and an outer shell made only of an epoxy resin.

2. The microcapsule for electrophoretic display devices according to claim 1, wherein the outer shell is made only of a melamine-crosslinked epoxy resin.

3. A sheet for electrophoretic display devices, comprising a layer containing microcapsules according to claim 2, and a binder resin.

4. The microcapsule for electrophoretic display devices according to claim 1, wherein the microcapsule has a capsule strength of 0.6 MPa or higher.

5. The microcapsule for electrophoretic display devices according to claim 4, wherein the outer shell is made only of a melamine-crosslinked epoxy resin.

6. A sheet for electrophoretic display devices, comprising a layer containing microcapsules according to claim 4, and a binder resin.

7. An electrophoretic display device comprising a data displaying part, wherein the data displaying part comprises a sheet for electrophoretic display devices according to claim 6.

8. An electronic equipment comprising a data displaying means, wherein the data displaying means comprises an electrophoretic display device according to claim 7.

9. A sheet for electrophoretic display devices, comprising a layer containing microcapsules according to claim 1, and a binder resin.

10. The sheet for electrophoretic display devices according to claim 9, wherein the layer containing microcapsules and a binder resin is formed on an electrically conductive film.

11. An electrophoretic display device comprising a data displaying part, wherein the data displaying part comprises a sheet for electrophoretic display devices according to claim 9.

12. An electronic equipment comprising a data displaying means, wherein the data displaying means comprises an electrophoretic display device according to claim 11.

13. A process for producing microcapsules for electrophoretic display devices, comprising:
dispersing a dispersion containing electrophoretic particles and a solvent as a core substance in a water-based medium;
subsequently carrying out a condensation reaction using an initial condensation product obtained by a reaction of at least one compound selected from the group consisting of urea, thiourea, melamine, benzoguanamine, acetoguanamine, and cyclohexylguanamine with formaldehyde, in a presence of a compound having a mercapto group(s) and either a carboxyl group(s) or a sulfo group(s), thereby forming an inner shell made only of a mercapto group-containing amino resin on a surface of the core substance;
dispersing microcapsules each enclosing the core substance in the inner shell in a water-based medium; and
subsequently adding an epoxy group-containing compound thereto, thereby forming an outer shell made only of an epoxy resin on an outer surface of the inner shell.

14. The production process according to claim 13, wherein a crosslinking agent is reacted with the epoxy group-containing compound when the outer shell is formed.

15. The production process according to claim 14, wherein an epoxy-melamine condensation product is added in addition to the epoxy group-containing compound when the outer shell is formed.

16. The production process according to claim 13, wherein an epoxy-melamine condensation product is added in addition to the epoxy group-containing compound when the outer shell is formed.

17. A process for producing microcapsules for electrophoretic display devices, comprising:
dispersing a dispersion containing electrophoretic particles and a solvent as a core substance in a water-based medium using a polysaccharide containing 10% by mass or greater of galactose unit and arabinose unit; and
subsequently forming at least one shell on a surface of the core substance.

* * * * *